US012262178B2

(12) United States Patent
Rottier

(10) Patent No.: US 12,262,178 B2
(45) Date of Patent: Mar. 25, 2025

(54) SOUND CAPTURE SYSTEM DEGRADATION IDENTIFICATION

(71) Applicant: COCHLEAR LIMITED, Macquarie University (AU)

(72) Inventor: Riaan Rottier, Macquarie University (AU)

(73) Assignee: Cochlear Limited, Macquarie University (AU)

( * ) Notice: Subject to any disclaimer, the term of this patent is extended or adjusted under 35 U.S.C. 154(b) by 173 days.

(21) Appl. No.: 17/777,827

(22) PCT Filed: Nov. 18, 2020

(86) PCT No.: PCT/IB2020/060849
§ 371 (c)(1),
(2) Date: May 18, 2022

(87) PCT Pub. No.: WO2021/099950
PCT Pub. Date: May 27, 2021

(65) Prior Publication Data

US 2022/0417675 A1 Dec. 29, 2022

Related U.S. Application Data

(60) Provisional application No. 62/936,703, filed on Nov. 18, 2019.

(51) Int. Cl.

| | |
|---|---|
| ***H04R 25/00*** | (2006.01) |
| ***H04R 1/40*** | (2006.01) |
| ***H04R 3/00*** | (2006.01) |
| ***H04R 29/00*** | (2006.01) |

(52) U.S. Cl.
CPC .......... *H04R 25/305* (2013.01); *H04R 1/406* (2013.01); *H04R 3/005* (2013.01); *H04R 29/005* (2013.01)

(58) Field of Classification Search
None
See application file for complete search history.

(56) References Cited

U.S. PATENT DOCUMENTS

| | | | |
|---|---|---|---|
| 7,340,062 | B2 | 3/2008 | Revit et al. |
| 8,223,982 | B2 | 7/2012 | Ibrahim |
| 8,379,876 | B2 | 2/2013 | Zhang |
| 8,958,586 | B2 | 2/2015 | Preves |
| 9,071,915 | B2 | 6/2015 | Roeck et al. |

(Continued)

FOREIGN PATENT DOCUMENTS

| | | |
|---|---|---|
| KR | 20120015661 A | 2/2012 |

OTHER PUBLICATIONS

International Search Report and Written Opinion for PCT/IB2020/060849, mailed Feb. 25, 2021.

*Primary Examiner* — Qin Zhu
(74) *Attorney, Agent, or Firm* — Pilloff Passino & Cosenza LLP; Martin J. Cosenza

(57) ABSTRACT

A method, including an action of receiving first data based on data based on ambient sound captured with a first microphone, and further including an action of receiving second data based on data based on the ambient sound captured with a second microphone, wherein the first microphone is a part of a hearing prosthesis, the second microphone is part of an indoor sound capture system or indoor sound capture sub-system, and the method further comprises comparing the first data to the second data.

32 Claims, 23 Drawing Sheets

(56) References Cited

U.S. PATENT DOCUMENTS

| | | | | |
|---|---|---|---|---|
| 9,775,998 | B2 | 10/2017 | Fredelake | |
| 9,986,947 | B2 | 6/2018 | Thibaut et al. | |
| 2005/0008177 | A1* | 1/2005 | Ibrahim | A61N 1/36039 381/56 |
| 2014/0146974 | A1 | 5/2014 | Krueger et al. | |
| 2015/0106026 | A1 | 4/2015 | Goldstein | |
| 2016/0037277 | A1 | 2/2016 | Matsumoto et al. | |
| 2016/0073210 | A1 | 3/2016 | Sheen | |
| 2016/0165360 | A1* | 6/2016 | Kulkami | H04R 3/005 381/60 |
| 2016/0345107 | A1* | 11/2016 | Van Dijk | H04R 25/505 |
| 2017/0078816 | A1 | 3/2017 | Lehnert et al. | |
| 2022/0054842 | A1* | 2/2022 | Zygorodimos | G16H 40/67 |

* cited by examiner

SOUND CAPTURE SYSTEM DEGRADATION IDENTIFICATION

CROSS-REFERENCE TO RELATED APPLICATIONS

This application claims priority to U.S. Provisional Application No. 62/936,703, entitled SOUND CAPTURE SYSTEM DEGRADATION IDENTIFICATION, filed on Nov. 18, 2019, naming Riaan ROTTIER of Macquarie University, Australia as an inventor, the entire contents of that application being incorporated herein by reference in its entirety.

BACKGROUND

Medical devices having one or more implantable components, generally referred to herein as implantable medical devices, have provided a wide range of therapeutic benefits to recipients over recent decades. In particular, partially or fully-implantable medical devices such as hearing prostheses (e.g., bone conduction devices, mechanical stimulators, cochlear implants, etc.), implantable pacemakers, defibrillators, functional electrical stimulation devices, and other implantable medical devices, have been successful in performing lifesaving and/or lifestyle enhancement functions and/or recipient monitoring for a number of years.

The types of implantable medical devices and the ranges of functions performed thereby have increased over the years. For example, many implantable medical devices now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from external devices that are part of, or operate in conjunction with, the implantable medical device.

SUMMARY

In an exemplary embodiment, there is a non-transitory computer-readable media having recorded thereon, a computer program for executing at least a portion of a method, the computer program including code for obtaining first data based on data based on ambient sound captured with a first microphone code for obtaining second data based on data based on the ambient sound captured with a second microphone code for comparing the first data to the second data, wherein the first microphone is a part of a hearing prosthesis, the second microphone is part of an indoor sound capture system or indoor sound capture sub-system, and the method further comprises comparing the first data to the second data.

In an exemplary embodiment, there is a system, comprising a hearing prosthesis including a microphone, a high-performance microphone system, wherein the microphone system is a separate component from the hearing prosthesis, the system is configured to compare data based on data based on sound captured by the hearing prosthesis to data based on data based on sound captured by the microphone system to determine a state of sound capture performance of the hearing prosthesis.

In an exemplary embodiment, there is a method, comprising by a recipient of a hearing prosthesis, naturally interacting in an environment with a system that includes one or more high quality microphones, wherein the action of naturally interacting includes being exposed to sound, and capturing the sound with the hearing prosthesis and automatically evaluating data based on data based on a signal output by a microphone of the hearing prosthesis used to capture the sound by comparing the data based on data based on the signal output by the microphone to other data based on data based on a signal output from one or more of the high-quality microphones.

BRIEF DESCRIPTION OF THE DRAWINGS

Embodiments are described below with reference to the attached drawings, in which.

DETAILED DESCRIPTION

Merely for ease of description, the techniques presented herein for location-based selection of processing settings are primarily described herein with reference to an illustrative medical device, namely a cochlear implant. However, it is to be appreciated that the techniques presented herein may also be used with a variety of other medical devices that, while providing a wide range of therapeutic benefits to recipients, patients, or other users, may benefit from setting changes based on the location of the medical device. For example, any techniques presented herein described for one type of hearing prosthesis, such as a cochlear implant, corresponds to a disclosure of another embodiment of using such teaching with another hearing prostheses, including acoustic hearing aids, bone conduction devices, middle ear auditory prostheses, direct acoustic stimulators, and also utilizing such with other electrically simulating auditory prostheses (e.g., auditory brain stimulators), etc. The techniques presented herein can be used with implantable/implanted microphones, whether or not used as part of a hearing prosthesis (e.g., a body noise or other monitor, whether or not it is part of a hearing prosthesis). The techniques presented herein can also be used with vestibular devices (e.g., vestibular implants), sensors, seizure devices (e.g., devices for monitoring and/or treating epileptic events, where applicable), sleep apnea devices, electroporation, etc., and thus any disclosure herein is a disclosure of utilizing such devices with the teachings herein, providing that the art enables such. In further embodiments, the techniques presented herein may be used with air purifiers or air sensors (e.g., automatically adjust depending on environment), hospital beds, identification (ID) badges/bands, or other hospital equipment or instruments, where such utilizes microphones.

Figure 1:
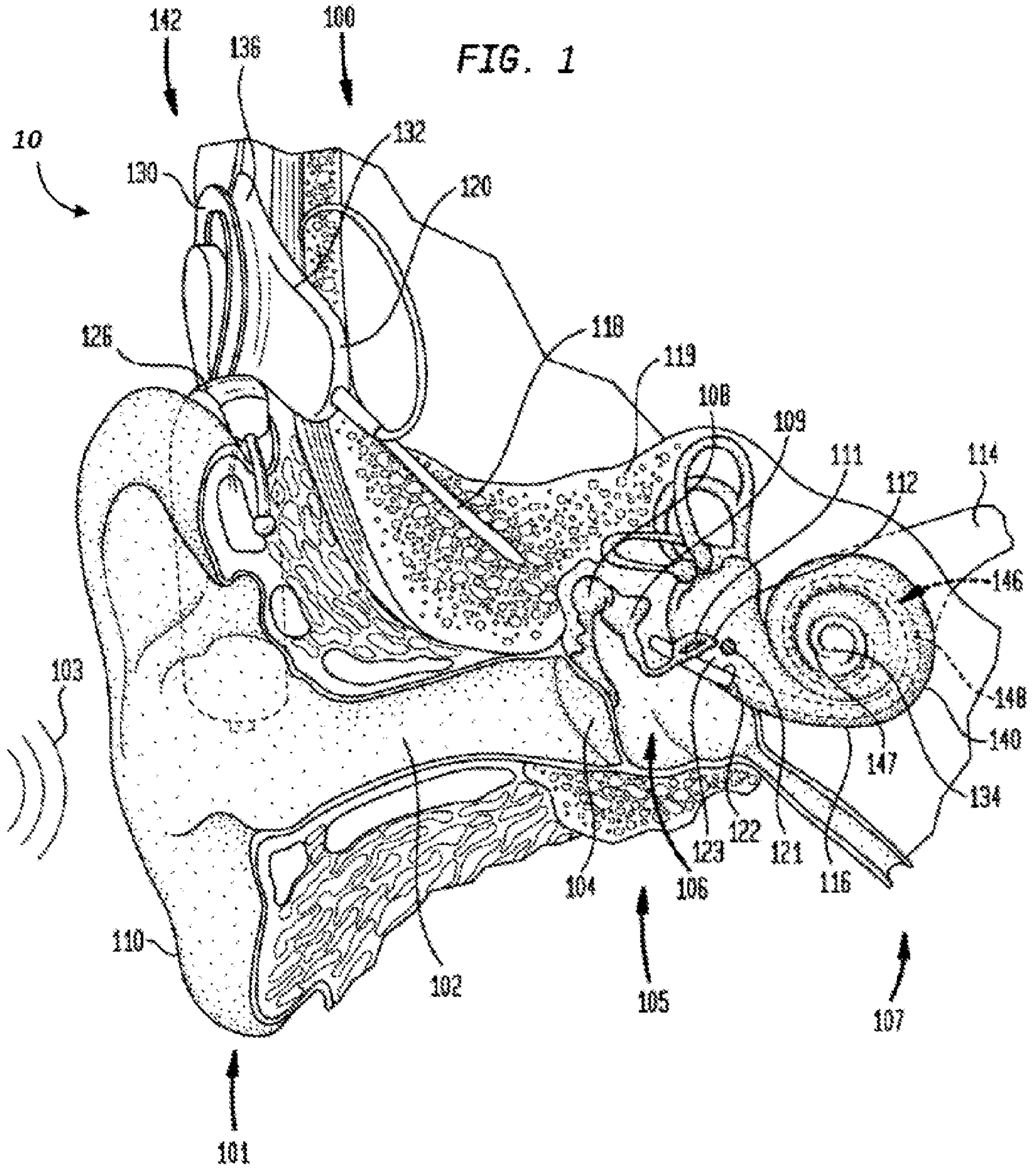
FIG. 1 is a perspective view of an exemplary hearing prosthesis in which at least some of the teachings detailed herein are applicable.

FIG. 1 is a perspective view of a cochlear implant, referred to as cochlear implant 100, implanted in a recipient, to which some embodiments detailed herein and/or variations thereof are applicable. The cochlear implant 100 is part of a system 10 that can include external components in some embodiments, as will be detailed below. Additionally, it is noted that the teachings detailed herein are also applicable to other types of hearing prostheses, such as by way of example only and not by way of limitation, bone conduction devices (percutaneous, active transcutaneous and/or passive transcutaneous), direct acoustic cochlear stimulators, middle ear implants, and conventional hearing aids, etc. Indeed, it is noted that the teachings detailed herein are also applicable to so-called multi-mode devices. In an exemplary embodiment, these multi-mode devices apply both electrical stimulation and acoustic stimulation to the recipient. In an exemplary embodiment, these multi-mode devices evoke a hearing percept via electrical hearing and bone conduction hearing. Accordingly, any disclosure herein with regard to one of these types of hearing prostheses corresponds to a disclosure of another of these types of hearing prostheses or any medical device for that matter, unless otherwise specified, or unless the disclosure thereof is incompatible with a given device based on the current state of technology. Thus, the teachings detailed herein are applicable, in at least some embodiments, to partially implantable and/or totally implantable medical devices that provide a wide range of therapeutic benefits to recipients, patients, or other users, including hearing implants having an implanted microphone, auditory brain stimulators, visual prostheses (e.g., bionic eyes), sensors, etc.

In view of the above, it is to be understood that at least some embodiments detailed herein and/or variations thereof are directed towards a body-worn sensory supplement medical device (e.g., the hearing prosthesis of FIG. 1, which supplements the hearing sense, even in instances when there are no natural hearing capabilities, for example, due to degeneration of previous natural hearing capability or to the lack of any natural hearing capability, for example, from birth). It is noted that at least some exemplary embodiments of some sensory supplement medical devices are directed towards devices such as conventional hearing aids, which supplement the hearing sense in instances where some natural hearing capabilities have been retained, and visual prostheses (both those that are applicable to recipients having some natural vision capabilities and to recipients having no natural vision capabilities). Accordingly, the teachings detailed herein are applicable to any type of sensory supplement medical device to which the teachings detailed herein are enabled for use therein in a utilitarian manner. In this regard, the phrase sensory supplement medical device refers to any device that functions to provide sensation to a recipient irrespective of whether the applicable natural sense is only partially impaired or completely impaired, or indeed never existed. Embodiments can include utilizing the teachings herein with a cochlear implant, a middle ear implant, a bone conduction device (percutaneous, passive transcutaneous and/or active transcutaneous), or a conventional hearing aid, etc.

The recipient has an outer ear 101, a middle ear 105, and an inner ear 107. Components of outer ear 101, middle ear 105, and inner ear 107 are described below, followed by a description of cochlear implant 100.

In a fully functional ear, outer ear 101 comprises an auricle 110 and an ear canal 102. An acoustic pressure or sound wave 103 is collected by auricle 110 and channeled into and through ear canal 102. Disposed across the distal end of ear channel 102 is a tympanic membrane 104 which vibrates in response to sound wave 103. This vibration is coupled to oval window or fenestra ovalis 112 through three bones of middle ear 105, collectively referred to as the ossicles 106 and comprising the malleus 108, the incus 109, and the stapes 111. Bones 108, 109, and 111 of middle ear 105 serve to filter and amplify sound wave 103, causing oval window 112 to articulate, or vibrate in response to vibration of tympanic membrane 104. This vibration sets up waves of fluid motion of the perilymph within cochlea 140. Such fluid motion, in turn, activates tiny hair cells (not shown) inside of cochlea 140. Activation of the hair cells causes appropriate nerve impulses to be generated and transferred through the spiral ganglion cells (not shown) and auditory nerve 114 to the brain (also not shown) where they are perceived as sound.

As shown, cochlear implant 100 comprises one or more components which are temporarily or permanently implanted in the recipient. Cochlear implant 100 is shown in FIG. 1 with an external device 142, that is part of system 10 (along with cochlear implant 100), which, as described below, is configured to provide power to implant, where the implanted cochlear implant includes a battery that is recharged by the power provided from the external device 142.

In the illustrative arrangement of FIG. 1, external device 142 can comprise a power source (not shown) disposed in a Behind-The-Ear (BTE) unit 126. External device 142 also includes components of a transcutaneous energy transfer link, referred to as an external energy transfer assembly. The transcutaneous energy transfer link is used to transfer power and/or data to cochlear implant 100. Various types of energy transfer, such as infrared (IR), electromagnetic, capacitive and inductive transfer, may be used to transfer the power and/or data from external device 142 to cochlear implant 100. In the illustrative embodiments of FIG. 1, the external energy transfer assembly comprises an external coil 130 that forms part of an inductive radio frequency (RF) communication link. External coil 130 is typically a wire antenna coil comprised of multiple turns of electrically insulated single-strand or multi-strand platinum or gold wire. External device 142 also includes a magnet (not shown) positioned within the turns of wire of external coil 130. It should be appreciated that the external device shown in FIG. 1 is merely illustrative, and other external devices may be used with embodiments.

Cochlear implant 100 comprises an internal energy transfer assembly 132 which can be positioned in a recess of the temporal bone adjacent auricle 110 of the recipient. As detailed below, internal energy transfer assembly 132 is a component of the transcutaneous energy transfer link and receives power and/or data from external device 142. In the illustrative embodiment, the energy transfer link comprises an inductive RF link, and internal energy transfer assembly 132 comprises a primary internal coil 136. Internal coil 136 is typically a wire antenna coil comprised of multiple turns of electrically insulated single-strand or multi-strand platinum or gold wire.

Cochlear implant 100 further comprises a main implantable component 120 and an elongate electrode assembly 118. In some embodiments, internal energy transfer assembly 132 and main implantable component 120 are hermetically sealed within a biocompatible housing. In some embodiments, main implantable component 120 includes an implantable microphone assembly (not shown) and a sound processing unit (not shown) to convert the sound signals received by the implantable microphone in internal energy transfer assembly 132 to data signals. That said, in some alternative embodiments, the implantable microphone assembly can be located in a separate implantable component (e.g., that has its own housing assembly, etc.) that is in signal communication with the main implantable component 120 (e.g., via leads or the like between the separate implantable component and the main implantable component 120). In at least some embodiments, the teachings detailed herein and/or variations thereof can be utilized with any type of implantable microphone arrangement. As noted above, the teachings herein can be applicable to use with an implantable microphone, and thus embodiments include one or more or all of the teachings herein used in conjunction with an implanted microphone.

Main implantable component 120 further includes a stimulator unit (also not shown) which generates electrical stimulation signals based on the data signals. The electrical stimulation signals are delivered to the recipient via elongate electrode assembly 118.

Elongate electrode assembly 118 has a proximal end connected to main implantable component 120, and a distal end implanted in cochlea 140. Electrode assembly 118 extends from main implantable component 120 to cochlea 140 through mastoid bone 119. In some embodiments electrode assembly 118 may be implanted at least in basal region 116, and sometimes further. For example, electrode assembly 118 may extend towards apical end of cochlea 140, referred to as cochlea apex 134. In certain circumstances, electrode assembly 118 may be inserted into cochlea 140 via a cochleostomy 122. In other circumstances, a cochleostomy may be formed through round window 121, oval window 112, the promontory 123 or through an apical turn 147 of cochlea 140.

Electrode assembly 118 comprises a longitudinally aligned and distally extending array 146 of electrodes 148, disposed along a length thereof. As noted, a stimulator unit generates stimulation signals which are applied by electrodes 148 to cochlea 140, thereby stimulating auditory nerve 114.

Figure 1A:
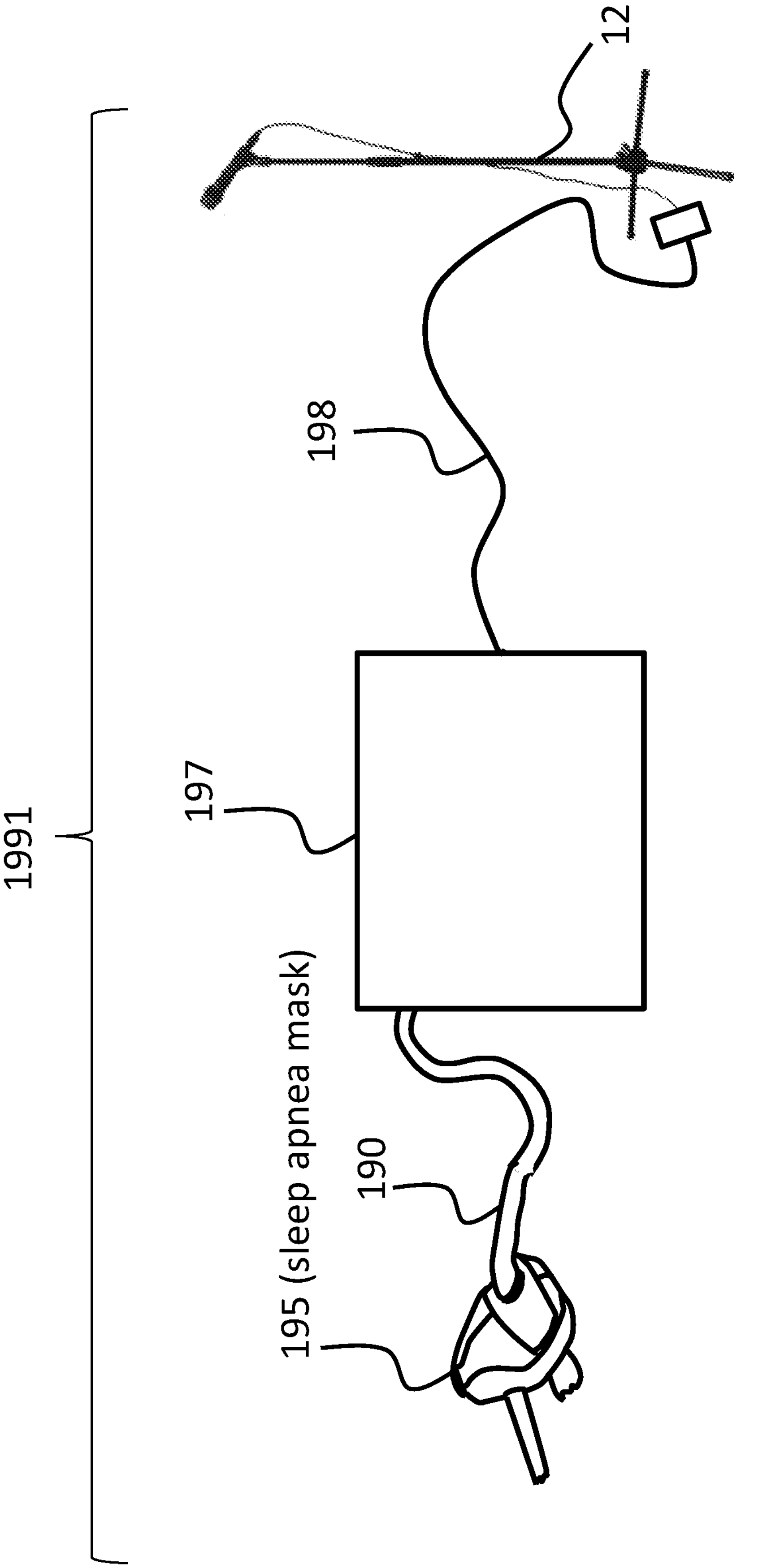
FIGS. 1A-C are views of exemplary sleep apnea medical devices in which at least some of the teachings detailed herein are applicable.

FIG. 1A provides a schematic of an exemplary conceptual sleep apnea system 1991. Here, this exemplary sleep apnea system utilizes a microphone 12 (represented conceptually) to capture a person's breathing or otherwise the sounds made by a person while sleeping. The microphone transduces the captured sound into an electrical signal which is provided via electrical leads 198 to the main unit 197, which includes a processor unit that can evaluate the signal from leads 198 or, in another embodiment, unit 197 is configured to provide that signal to a remote processing location via the Internet of the like, where the signal was evaluated. Upon an evaluation that an action should be taken or otherwise can be utilitarian taken by the sleep apnea system 1991, the unit 197 activates to implement sleep apnea countermeasures, which countermeasures are conducted by a hose 1902 sleep apnea mask 195. By way of example only and not by way of limitation, pressure variations can be used to treat the sleep apnea upon an indication of such an occurrence.

Figure 1B:
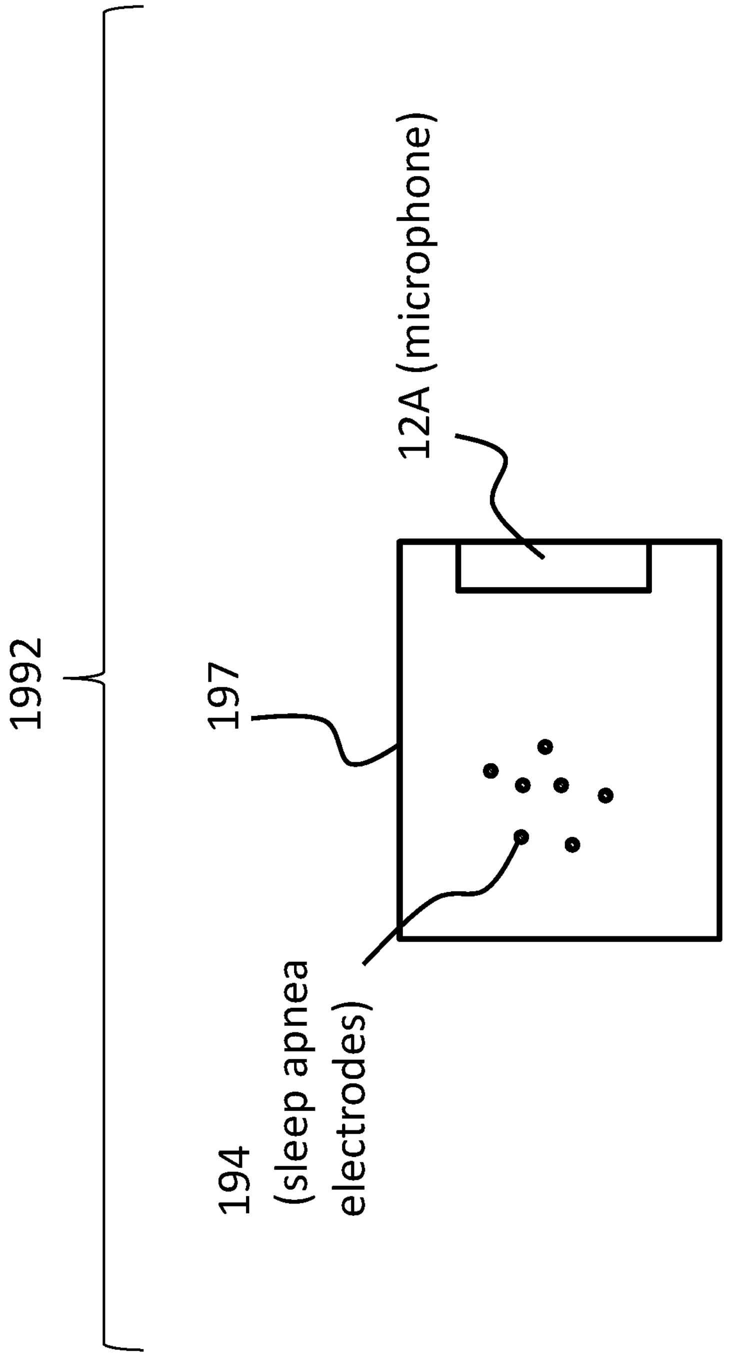
Figure 1C:
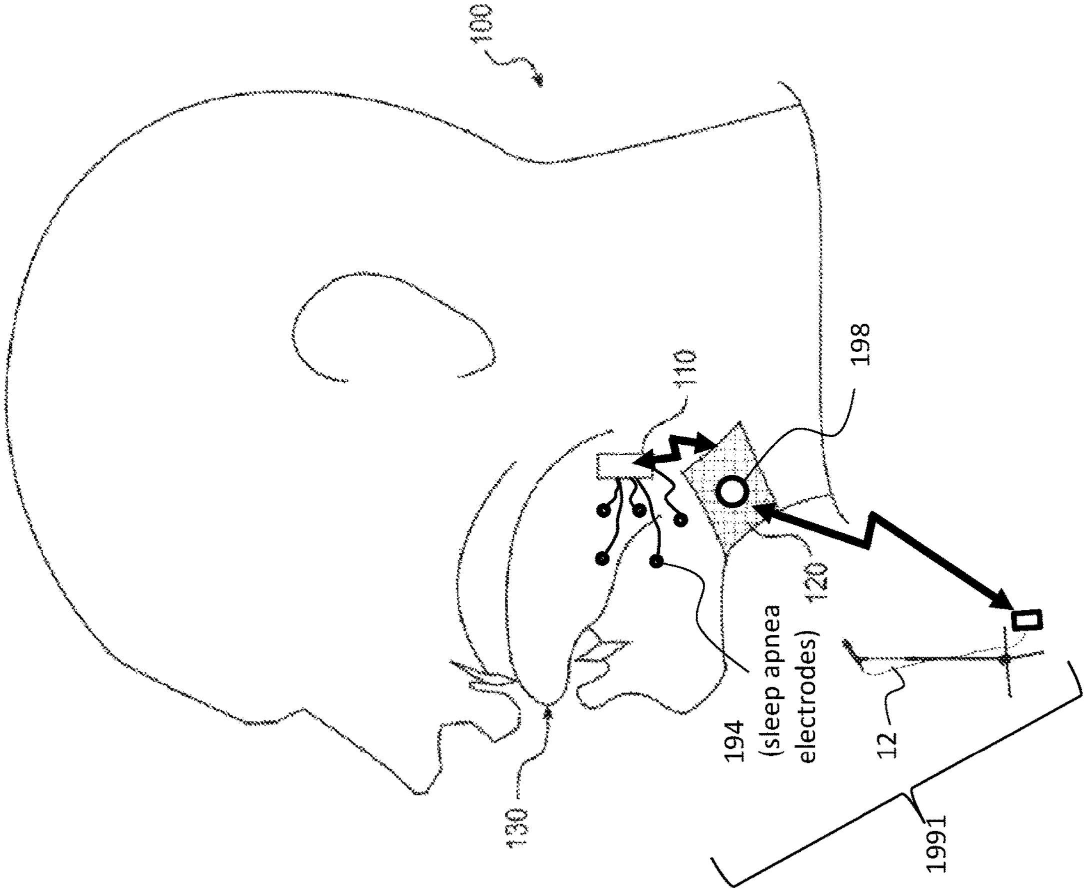

FIGS. 1B and 1C provide another exemplary schematic of another exemplary conceptual sleep apnea system 1992. Here, the sleep apnea system is different from that of FIG. 1A in that electrodes 194 (which can be implanted in some embodiments) are utilized to provide stimulation to the human who is experiencing a sleep apnea scenario. FIG. 1B illustrates an external unit, and FIG. 1C illustrates the external unit 120 and an implanted unit 110 in signal communication via an inductance coil 707 of the external unit and a corresponding implanted inductance coil (not shown) of the implanted unit, according to which the teachings herein can be applicable. Implanted unit 110, can be configured for implantation in a recipient, in a location that permits it to modulate nerves of the recipient 100 via electrodes 194. In treating sleep apnea, implant unit 110 and/or the electrodes thereof can be located on a genioglossus muscle of a patient. Such a location is suitable for modulation of the hypoglossal nerve, branches of which run inside the genioglossus muscle.

External unit 120 can be configured for location external to a patient, either directly contacting, or close to the skin of the recipient. External unit 120 may be configured to be affixed to the patient, for example, by adhering to the skin of the patient, or through a band or other device configured to hold external unit 120 in place. Adherence to the skin of external unit 120 may occur such that it is in the vicinity of the location of implant unit 110 so that, for example, the external unit 120 can be in signal communication with the implant unit 110 as conceptually shown, which communication can be via an inductive link or an RF link or any link that can enable treatment of sleep apnea using the implant unit and the external unit. External unit can include a processor unit 198 that is configured to control the stimulation executed by the implant unit 110. In this regard, processor unit 198 can be in signal communication with microphone 12, via electrical leads, such as in an embodiment where the external unit 120 is a modularized component, or via a wireless system, such as conceptually represented in FIG. 1C.

A common feature of both of these sleep apnea treatment systems is the utilization of the microphone to capture sound, and the utilization of that captured sound to implement one or more features of the sleep apnea system.

Figure 2A:
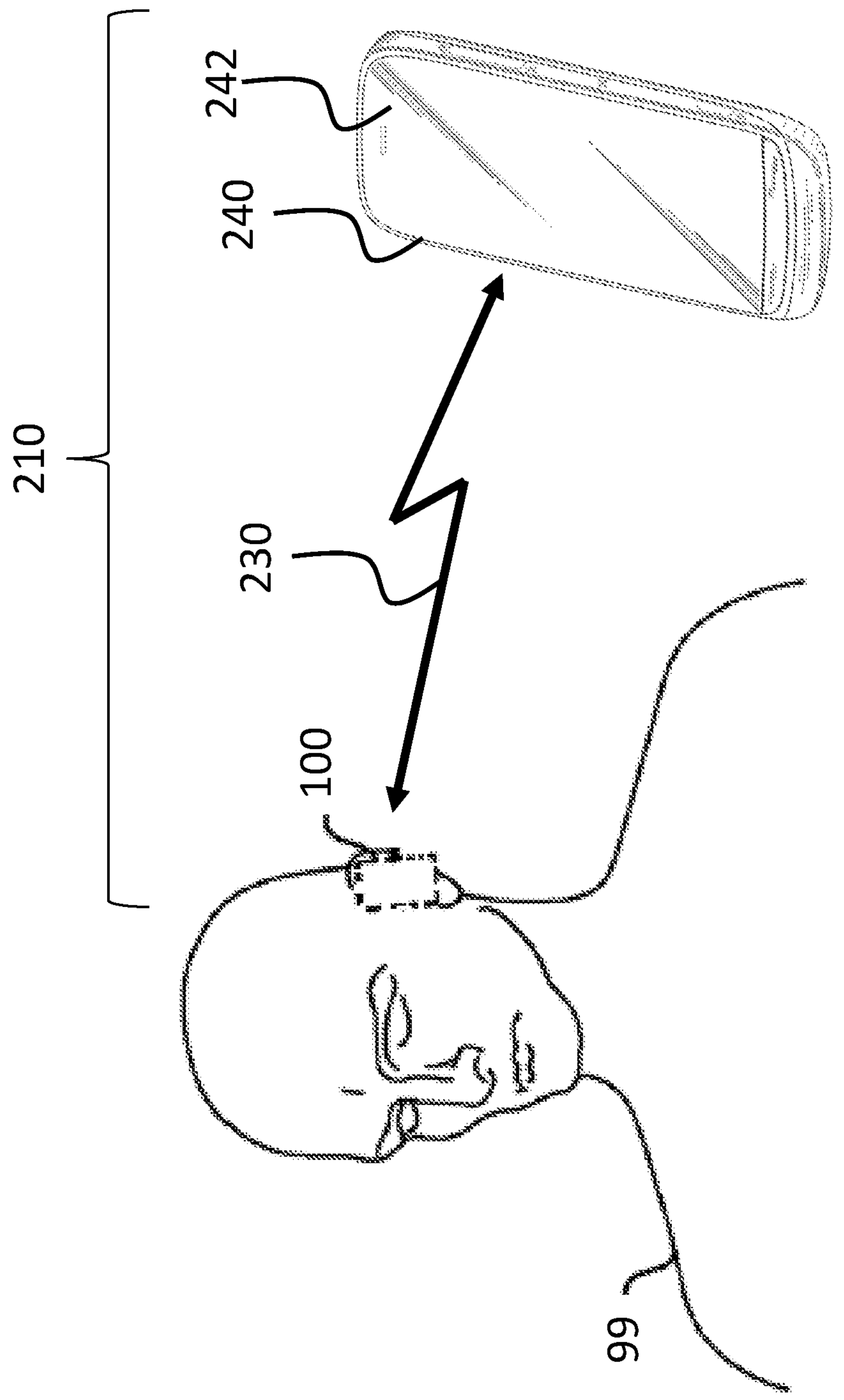
FIGS. 2A-3 presents exemplary systems.

FIG. 2A depicts an exemplary system 210 according to an exemplary embodiment, including hearing prosthesis 100, which, in an exemplary embodiment, corresponds to cochlear implant 100 detailed above, and a portable body carried device (e.g. a portable handheld device as seen in FIG. 2A, a watch, a pocket device, etc.) 240 in the form of a mobile computer having a display 242. The system includes a wireless link 230 between the portable handheld device 240 and the hearing prosthesis 100. In an embodiment, the prosthesis 100 is an implant implanted in recipient 99 (as represented functionally by the dashed lines of box 100 in FIG. 2A).

In an exemplary embodiment, the system 210 is configured such that the hearing prosthesis 100 and the portable handheld device 240 have a symbiotic relationship. In an exemplary embodiment, the symbiotic relationship is the ability to display data relating to, and, in at least some instances, the ability to control, one or more functionalities of the hearing prosthesis 100. In an exemplary embodiment, this can be achieved via the ability of the handheld device 240 to receive data from the hearing prosthesis 100 via the wireless link 230 (although in other exemplary embodiments, other types of links, such as by way of example, a wired link, can be utilized). As will also be detailed below, this can be achieved via communication with a geographically remote device in communication with the hearing prosthesis 100 and/or the portable handheld device 240 via link, such as by way of example only and not by way of limitation, an Internet connection or a cell phone connection. In some such exemplary embodiments, the system 210 can further include the geographically remote apparatus as well. Again, additional examples of this will be described in greater detail below.

As noted above, in an exemplary embodiment, the portable handheld device 240 comprises a mobile computer and a display 242. In an exemplary embodiment, the display 242 is a touchscreen display. In an exemplary embodiment, the portable handheld device 240 also has the functionality of a portable cellular telephone. In this regard, device 240 can be, by way of example only and not by way of limitation, a smart phone as that phrase is utilized generically. That is, in an exemplary embodiment, portable handheld device 240 comprises a smart phone, again as that term is utilized generically.

It is noted that in some other embodiments, the device 240 need not be a computer device, etc. It can be a lower tech recorder, or any device that can enable the teachings herein.

The phrase "mobile computer" entails a device configured to enable human-computer interaction, where the computer is expected to be transported away from a stationary location during normal use. Again, in an exemplary embodiment, the portable handheld device 240 is a smart phone as that term is generically utilized. However, in other embodiments, less sophisticated (or more sophisticated) mobile computing devices can be utilized to implement the teachings detailed herein and/or variations thereof. Any device, system, and/or method that can enable the teachings detailed herein and/or variations thereof to be practiced can be utilized in at least some embodiments. (As will be detailed below, in some instances, device 240 is not a mobile computer, but instead a remote device (remote from the hearing prosthesis 100. Some of these embodiments will be described below).)

In an exemplary embodiment, the portable handheld device 240 is configured to receive data from a hearing prosthesis and present an interface display on the display from among a plurality of different interface displays based on the received data. Exemplary embodiments will sometimes be described in terms of data received from the hearing prosthesis 100. However, it is noted that any disclosure that is also applicable to data sent to the hearing prostheses from the handheld device 240 is also encompassed by such disclosure, unless otherwise specified or otherwise incompatible with the pertinent technology (and vice versa).

It is noted that in some embodiments, the system 210 is configured such that cochlear implant 100 and the portable device 240 have a relationship. By way of example only and not by way of limitation, in an exemplary embodiment, the relationship is the ability of the device 240 to serve as a remote microphone for the prosthesis 100 via the wireless link 230. Thus, device 240 can be a remote mic. That said, in an alternate embodiment, the device 240 is a stand-alone recording/sound capture device.

It is noted that in at least some exemplary embodiments, the device 240 corresponds to an Apple Watch™ Series 1 or Series 2, as is available in the United States of America for commercial purchase as of Oct. 13, 2019. In an exemplary embodiment, the device 240 corresponds to a Samsung Galaxy Gear™ Gear 2, as is available in the United States of America for commercial purchase as of Oct. 13, 2019. The device is programmed and configured to communicate with the prosthesis and/or to function to enable the teachings detailed herein.

Figure 2B:
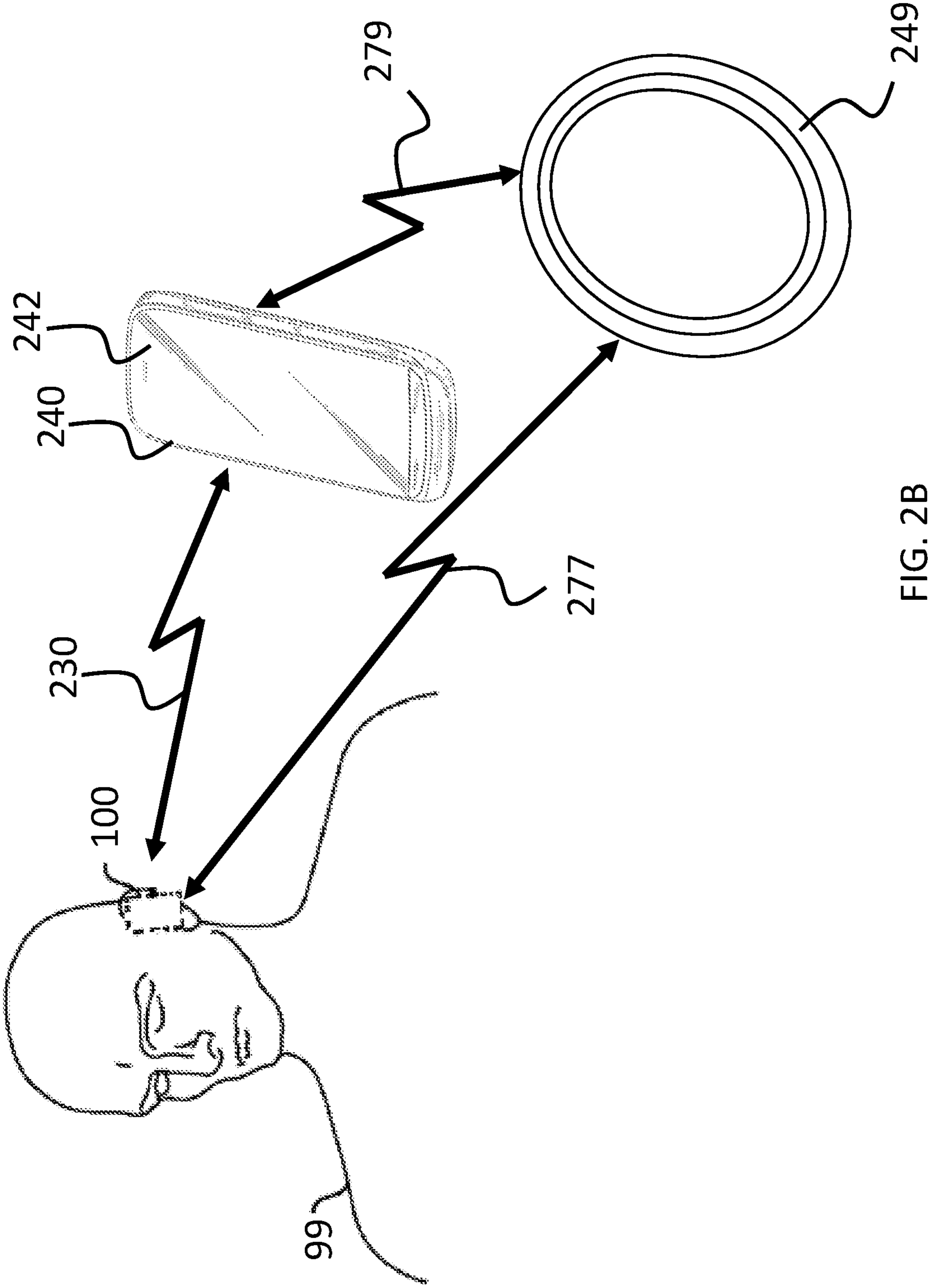
Figure 3:
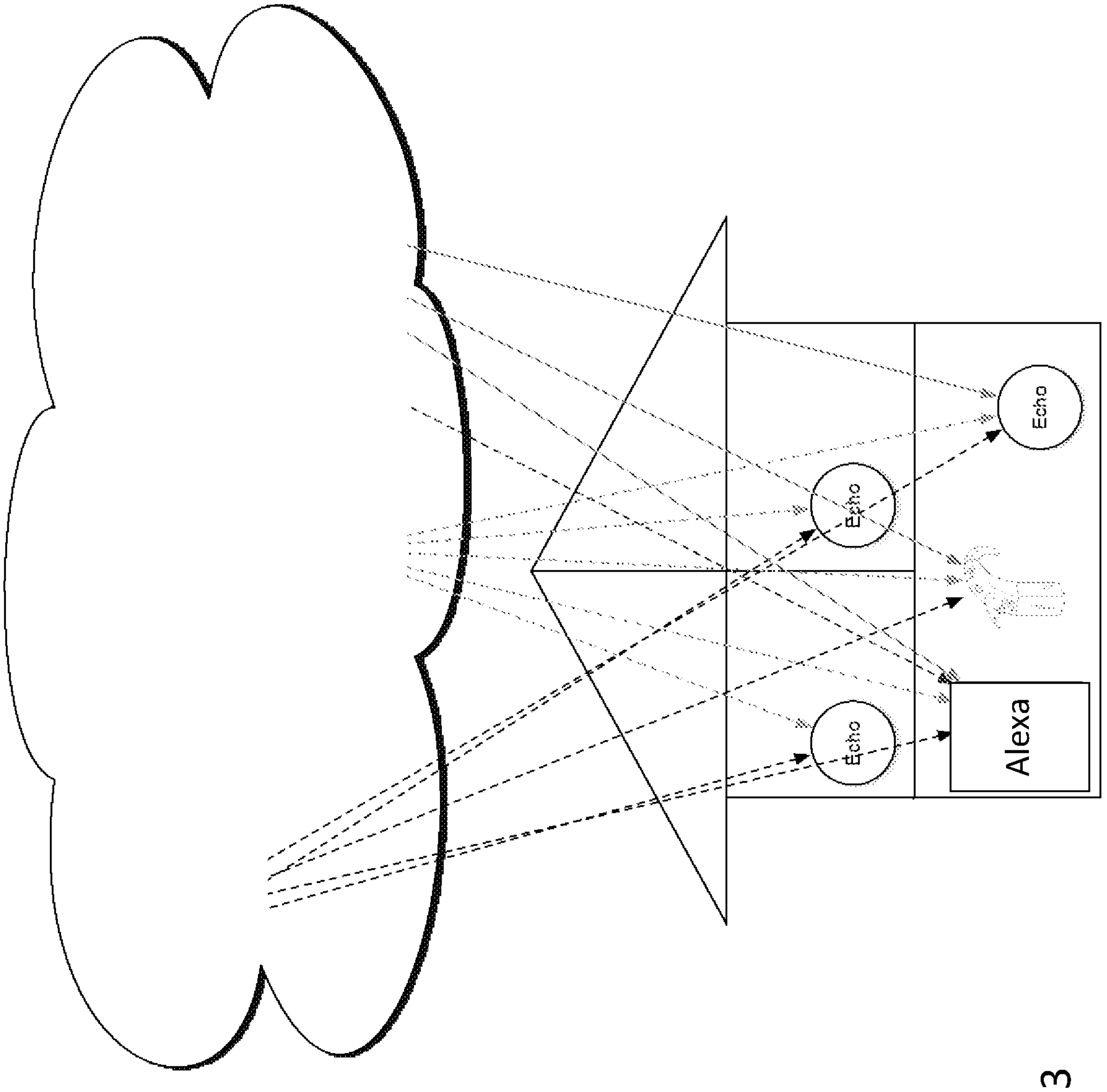

In an exemplary embodiment, a telecommunication infrastructure can be in communication with the hearing prosthesis 100 and/or the device 240. By way of example only and not by way of limitation, a telecoil 249 or some other communication system (Bluetooth, etc.) is used to communicate with the prosthesis and/or the remote device. FIG. 2B depicts an exemplary quasi-functional schematic depicting communication between an external communication system 249 (e.g., a telecoil), and the hearing prosthesis 100 and/or the handheld device 240 by way of links 277 and 279, respectively (note that FIG. 2B depicts two-way communication between the hearing prosthesis 100 and the external audio source 249, and between the handheld device and the external audio source 249—in alternate embodiments, the communication is only one way (e.g., from the external audio source 249 to the respective device)).

An exemplary embodiment utilizes existing microphones that might be found in a house or a commercial building (office building) or an automobile or the like or in a workplace environment, to capture sound that is associated with a recipient. These microphones are utilized to capture sounds via high quality capture (more on this below). In this regard, by way of example only, there are more and more high-performance microphone arrays in people's homes, for example Amazon Echo (7 microphones), Apple HomePod (7 microphones), etc. These microphone arrays are connected to the cloud and allow third parties to write specific software that use the capabilities of the microphone array—for example Amazon Alexa 7-Mic Far Field Dev Kit.

There can be utilitarian value with respect to some of the teachings detailed herein by utilizing existing hardware or other components that can enable the teachings detailed herein that are placed at points in a room or building, etc., rather than requiring specialized hardware. In at least some exemplary embodiments, the microphone arrays on the aforementioned systems and variations thereof and similar systems are able to differentiate the location of sound originators (speakers, for example) in a given location and are able to obtain high quality audio from a plurality of microphones, such as by way of example only and not by way of limitation, through beamforming, noise cancellation, and/or echo cancellation. Furthermore, these systems, in some embodiments, can support real-time streaming and/or cloud-based analysis. Some embodiments include methods, devices, and systems that utilize such to implement the teachings detailed herein.

Figure 4A:
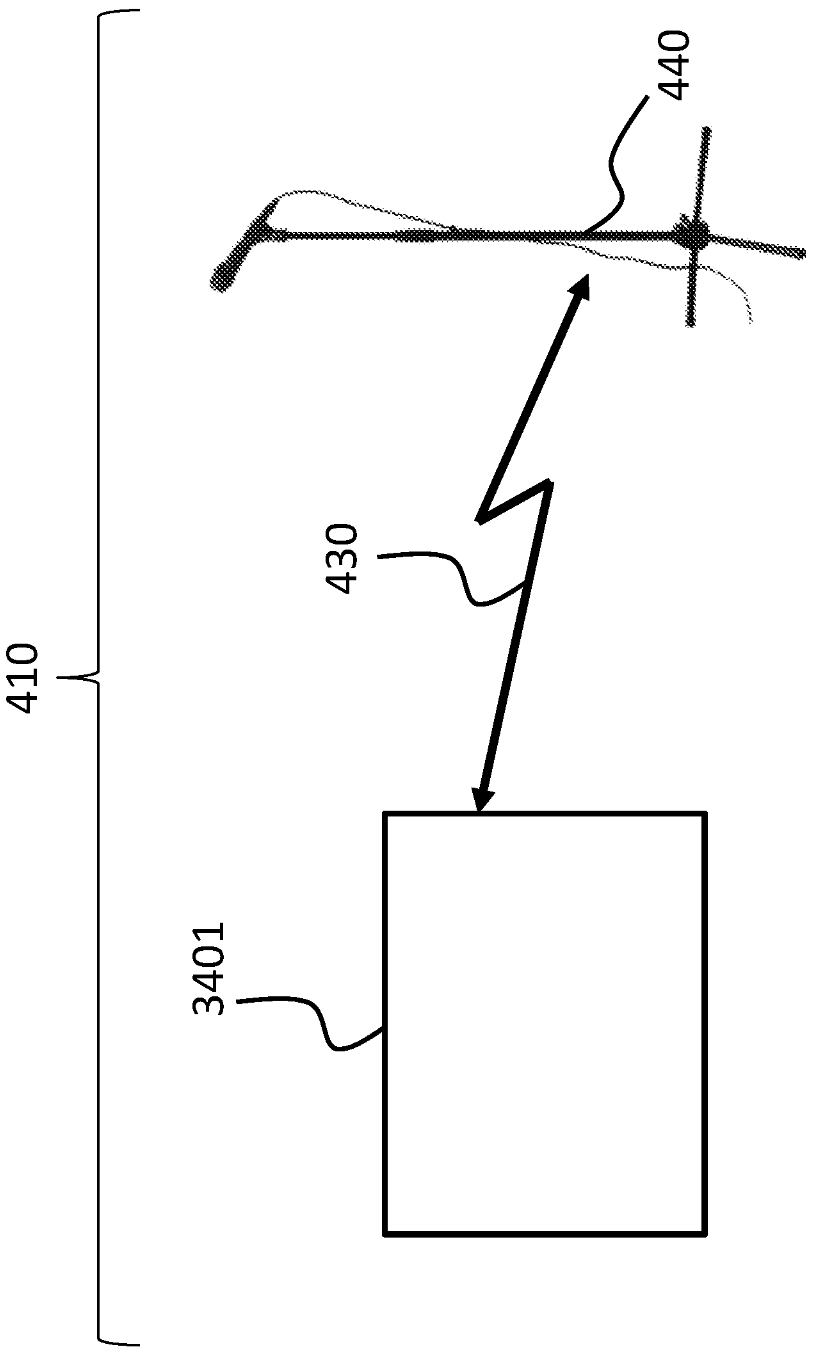
FIGS. 4A-4E present additional exemplary systems.

FIG. 4A depicts an embodiment of a system 410 where a microphone system 440 is utilized to capture sound. In an exemplary embodiment, microphone system 440 is configured to capture sound utilizing the microphone apparatus thereof, and provide the sound that is captured via link 430 to a processor apparatus 3401. In an exemplary embodiment, link 430 is utilized to stream the captured audio signal captured by the microphone apparatus utilizing an RF transmitter, and the processor apparatus 3401 includes an RF receiver that receives the transmitted RF signal. That said, in an exemplary embodiment, the microphone system 440 utilizes an onboard processor or the like to evaluate the signal, and provides a signal based on the captured sound that is indicative of the evaluation to the processor apparatus 3401. Some additional features of this will be described in greater detail below.

Figure 4B:
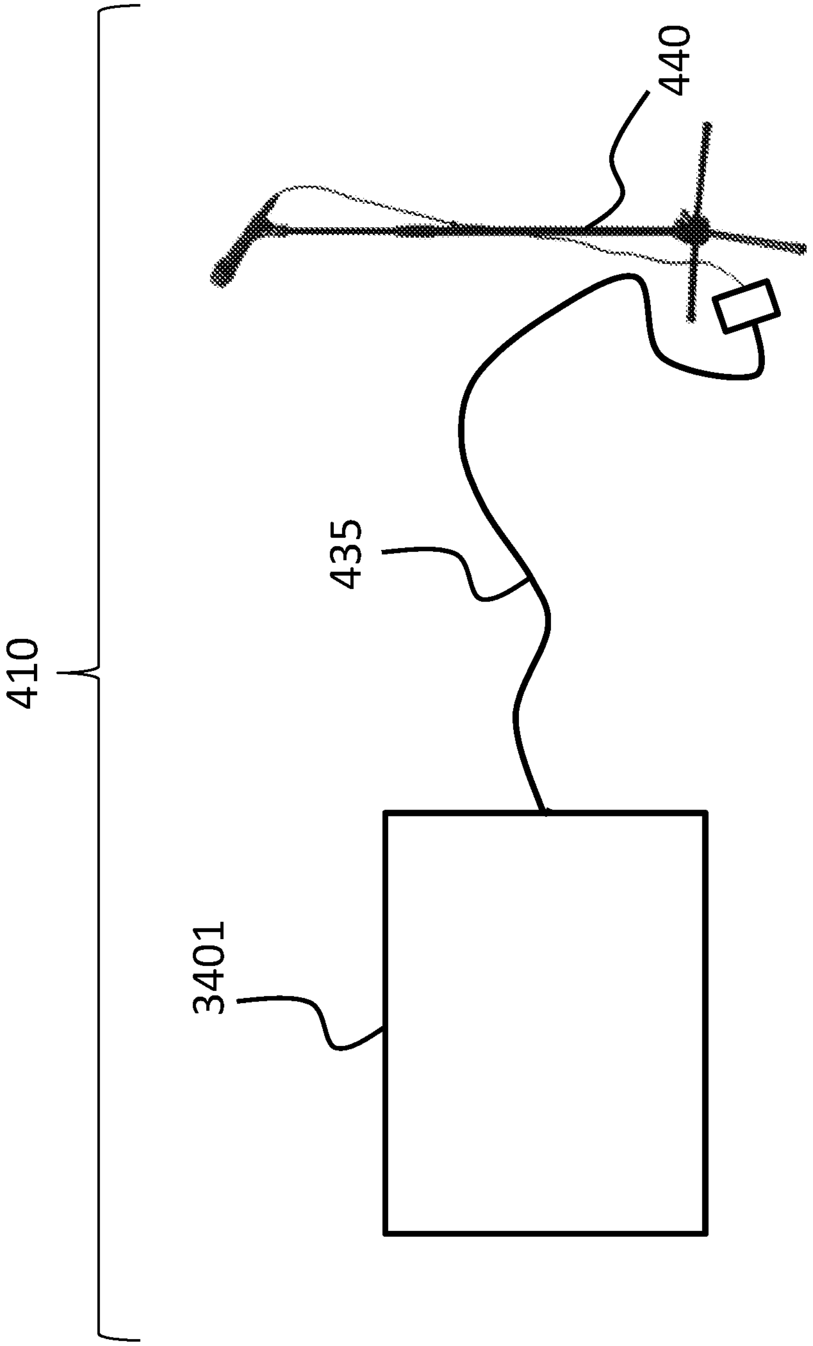

The above said, FIG. 4B depicts an alternate embodiment, that utilizes a hard wire system/landline 435, to communicate between processor 3401 and microphone system 440. This can be a conventional telephone line. Any hard wire system that can enable such can be used (e.g., coax cable, fiber optics, copper wire, other types of wire, etc.). The above said, in an alternate embodiment, infrared communication can be utilized. Herein, any disclosure of RF communication corresponds to an alternate disclosure of a hard wire or an IR system, and vice versa.

Figure 4C:
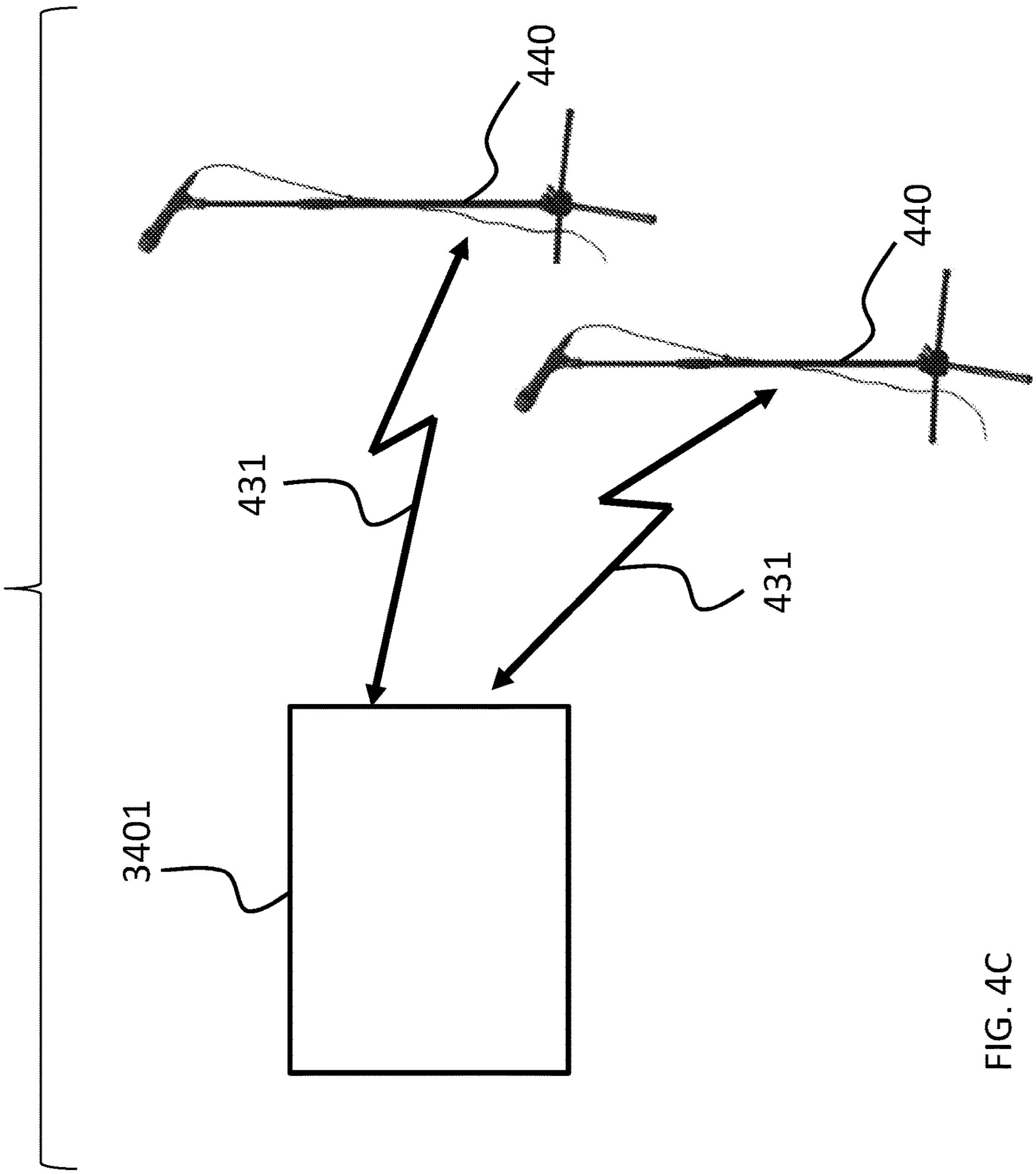
Figure 4D:
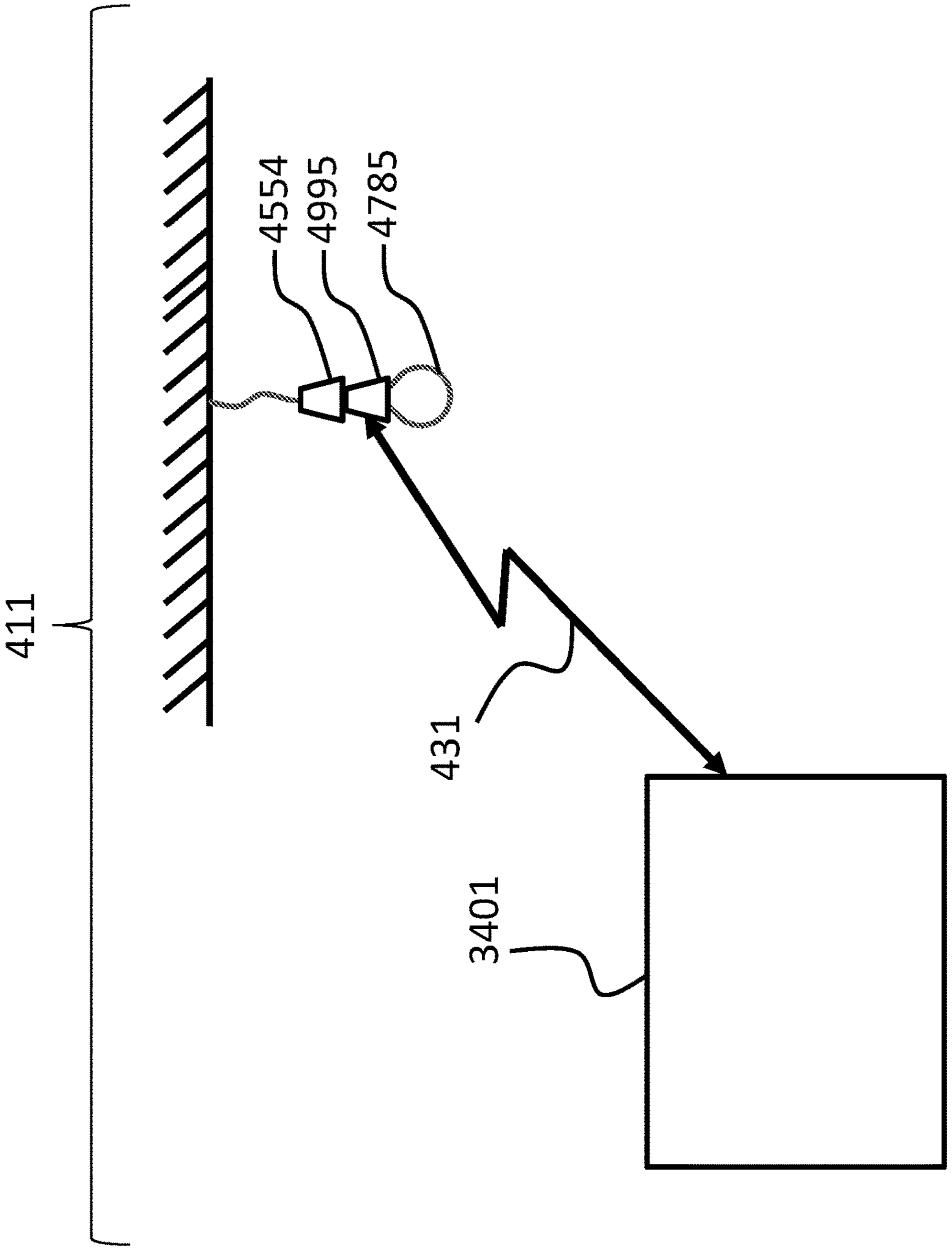

FIG. 4C depicts an alternate embodiment of a system 411 that includes a plurality of microphone systems 440 (sometimes herein, the generic term microphone is used) that are in signal communication via the respective wireless links 431 (or comparable wire links). Again, the plurality of microphones can correspond to microphones that are part of a household device, such as the aforementioned Amazon Echo or an Alexa device, or a computer or any other microphone that is part of a household device that can have utilitarian value or otherwise enable the teachings detailed herein. Further, it is noted that one or more of the microphone systems 440 can be microphones that are presented or otherwise positioned within a given structure (house, building, etc.) for the purposes of implementing the teachings detailed herein, and no other purpose. In this regard, an exemplary embodiment includes a package of microphone systems that are in the form of microphone-transmitter assemblies that are configured to be figuratively thrown around a house or a building at various locations, which assemblies have their own power sources and known transmitters that can communicate with each other (relay purposes) and/or with the central processor apparatus 3401, and/or with the hearing prosthesis as will be described below. In some other embodiments, these devices can be plugged into wall outlets. In an exemplary embodiment, these devices can have an outlet so that the outlet is not "used up" by the assembly—that is, the outlets can power the microphone-transmitter assembly in parallel to an outlet—indeed, in an exemplary embodiment, the assembly can be positioned at the "best" outlet in a given room for the purposes of utility. Still further, in an exemplary embodiment, with reference to FIG. 4D, the microphone—transmitter assembly 4995 can be a device that is screwed into a light outlet 4554, such as the light outlet of a ceiling based light, which also has a receptacle for the lightbulb 4785—this can enable the microphone transmitter to be located in a given room at a location (up high) where there will almost never be anything between a sound source and the microphone, as seen in FIG. 4D. Still, in an exemplary embodiment, microphones that are parts of consumer electronics devices are utilized, where the signals from the microphone can be obtained via the Internet of things or the like or any other arrangement that can enable the teachings detailed herein, providing that the microphones can capture sound and/or output a signal that is of sufficient quality to enable the teachings detailed herein.

Figure 4E:
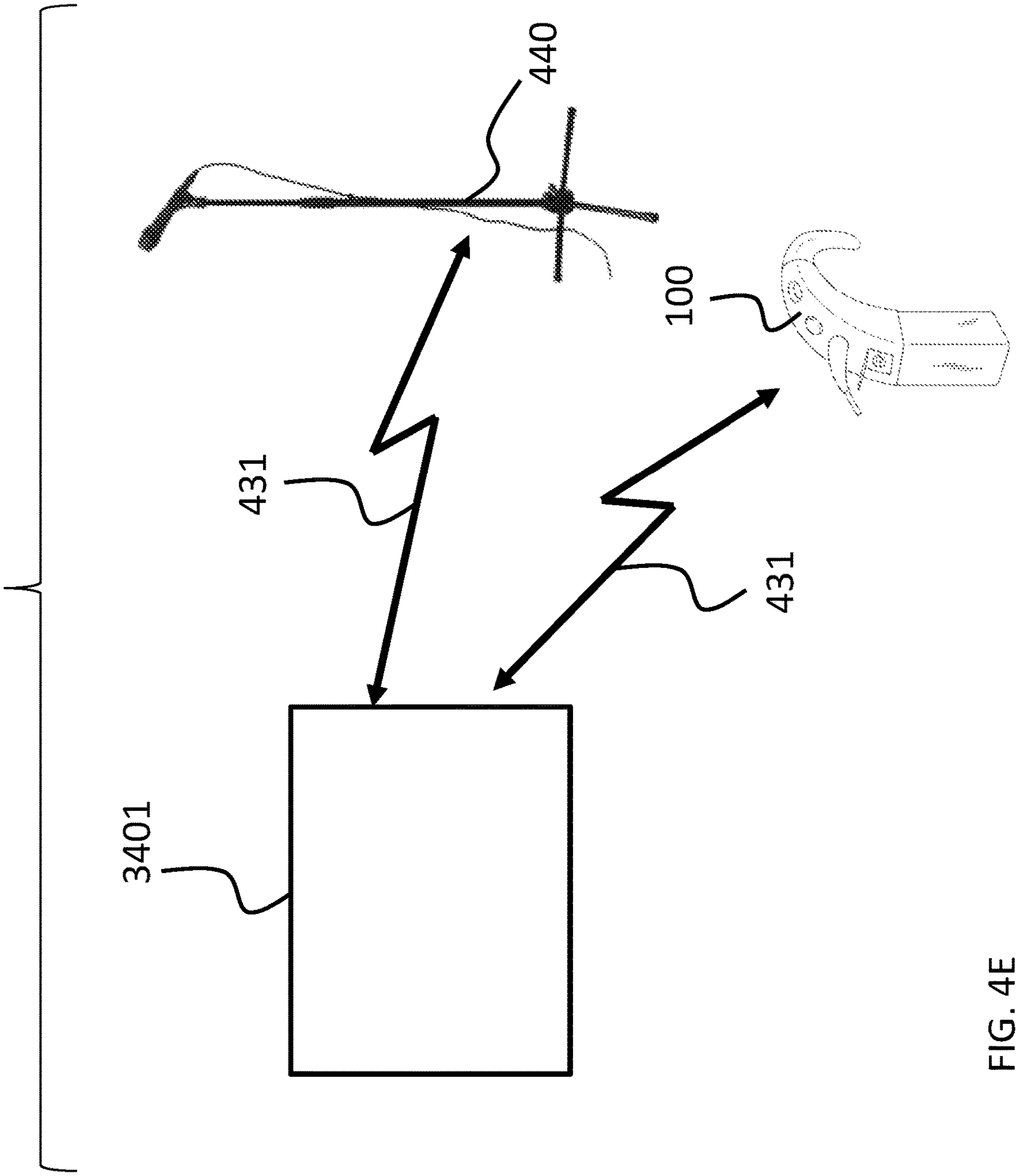

It is noted that in at least some exemplary embodiments, the central processor apparatus 3401 can be the hearing prosthesis 100. That said, in an alternate embodiment, it is a separate component relative to the hearing prosthesis 100. FIG. 4E presents an exemplary embodiment where central processor apparatus 3401 is in signal communication with the prosthesis 100. The central processor apparatus can be a smart phone of the recipient or a caregiver, and/or can be a personal computer or the like that is located in the house and/or can be a mainframe computer where the inputs based on data collected or otherwise obtained by the microphones is provided via a link, such as via the Internet, or the like, to a remote processor. In some exemplary embodiments, signal processor 3401 can interface with the cloud, just as the other components of the system can do so, directly or indirectly, to implement cloud computing.

In view of the above, it is to be understood that in an exemplary embodiment, there is a system, comprising a central processor apparatus configured to receive input from a plurality of sound capture devices, such as, for example, the high quality microphones of the consumer electronics devices, represented by, for example, microphone systems 440 detailed above and/or the microphone(s) of one or more hearing prostheses, and/or from microphones or other sound capture devices of a hearing prosthesis and/or someone else's hearing prosthesis (in an exemplary embodiment, one or more of the sound capture devices are respective sound capture devices of hearing prostheses of people in the area, where the hearing prostheses are in signal communication with the central processor (directly or indirectly, such as, with respect to the latter, through a smart phone, or a cell phone, etc.) such an embodiment can also enable a dynamic system where the microphones move around from location to locations). The input can be the raw signal/modified signal (e.g., amplified and/or some features taken out/compression techniques can be applied thereto) from the microphones of the sound capture devices.

High quality microphones are microphones that are stable over time, regardless of the performance in regard to sensitivity, polar pattern, dynamic range and frequency response.

The phrase "data based on data from a microphone" can correspond to the raw output signal of the microphone(s), a signal that is a modified version of the raw output signal of the microphone, a signal that is an interpretation of the raw output, etc. It is also noted that the signal processing system can be based in a hearing prosthesis, a smartphone, a personal computer, etc.

Thus, in an exemplary embodiment, there is a system that includes microphones that are configured to output respective signals indicative of respective captured sounds. The system is further configured to provide the respective signals and/or modified signals based on the respective signals to the central processor apparatus as input from the plurality of sound capture devices. Conversely, in some embodiments, the input can be a signal that is based on the sound captured by the microphones, but the signal is a data signal that results from the processing or otherwise the evaluations of the microphones, which data signal is provided to the central processor apparatus 3401. In this exemplary embodiment, the central processor apparatus is configured to collectively evaluate the input from the plurality of sound capture devices.

In an exemplary embodiment, the processor apparatus includes a processor, which processor of the processor apparatus can be a standard microprocessor supported by software or firmware or the like that is programmed to evaluate signals or other data received from or otherwise based on the sound capture device(s). By way of example only and not by way of limitation, in an exemplary embodiment, the microprocessor can have access to lookup tables or the like having data associated with spectral analysis of a given sound signal, by way of example, and can compare features of the input signal and compare those features to features in the lookup table, and, via related data in the lookup table associated with those features, make a determination about the input signal, and thus make a determination related to the sound and/or classifying the sound. In an exemplary embodiment, the processor is a processor of a sound analyzer. The sound analyzer can be FFT based or based on another principle of operation. The sound analyzer can be a standard sound analyzer available on smart phones or the like. The sound analyzer can be a standard audio analyzer. The processor can be part of a sound wave analyzer. Moreover, it is specifically noted that while the embodiment of the figures above present the processor apparatus 3401, and thus the processor thereof, as a device that is remote from the hearing prosthesis and/or the smart phones, and/or the microphones and the components having the microphones, etc., the processor can instead be part of one of the devices of the hearing prosthesis or the portable electronics device (e.g., smart phone, or any other device that can have utilitarian value with respect to implementing the teachings detailed herein) or even the stationary electronic devices, etc. Still, consistent with the teachings above, it is noted that in some exemplary embodiments, the processor can be remote from the prosthesis and the smart phones or other portable consumer electronic devices.

By way of example only and not by way of limitation, in an exemplary embodiment, any one or more of the devices of systems detailed herein can be in signal communication via Bluetooth technology or other RF signal communication systems with each other and/or with a remote server that is linked, via, for example, the Internet or the like, to a remote processor. Indeed, in at least some exemplary embodiments, the processor apparatus 3401 is a device that is entirely remote from the other components of the system. That said, in an exemplary embodiment, the processor apparatus 3401 is a device that has components that are spatially located at different locations in a global manner, which components can be in signal communication with each other via the Internet or the like. In an exemplary embodiment, the signals received from the sound capture devices can be provided via the Internet to this remote processor, whereupon the signal is analyzed, and then, via the Internet, the signal indicative of an instruction related to data related to a recipient of the hearing prostheses can be provided to the device at issue, such that the device can output such. Note also that in an exemplary embodiment, the information received by the processor can simply be the results of the analysis, whereupon the processor can analyze the results of the analysis, and identify information that will then be outputted as will be described in greater detail below. It is noted that the term "processor" as utilized herein, can correspond to a plurality of processors linked together, as well as one single processor, and this is the case with respect to the phrase "central processor" as well.

In an exemplary embodiment, the system includes a sound analyzer in general, and, in some embodiments, a speech analyzer in particular (e.g., such as in an embodiment described below where the system analyzes speech to determine or otherwise deduce a location of a recipient), such as by way of example only and not by way of limitation, one that is configured to perform spectrographic measurements and/or spectral analysis measurements and/or duration measurements and/or fundamental frequency measurements. By way of example only and not by way of limitation, such can correspond to a processor of a computer that is configured to execute the SIL Language Technology Speech Analyzer™ program, or the teachings of U.S. Pat. No. 8,708,702. In this regard, the program can be loaded onto memory of the system, and the processor can be configured to access the program to analyzer otherwise evaluate the speech. In an alternate embodiment, the speech analyzer can be that available from Rose Medical, which programming can be loaded one to the memory of the system. Moreover, in an exemplary embodiment, any one or more of the method actions detailed herein and/or the functionalities of the devices and/or systems detailed herein can be implemented utilizing a machine learning system, such as by way of example only and not by way of limitation, a neural network and/or a deep neural network, etc. In this regard, in an exemplary embodiment, the various data that is utilized to achieve the utilitarian values presented herein is analyzed or otherwise manipulated or otherwise studied or otherwise executed by a neural network such as a deep neural network or any other product of machine learning. In some embodiments, the artificial intelligence system or otherwise product of machine learning is implemented in the hearing prostheses, while in other embodiments, it can be implemented in any of the other devices disclosed herein, such as a smart phone or a personal computer or a remote computer, etc.

In an exemplary embodiment, the central processing assembly can include an audio analyzer, which can analyze one or more of the following parameters: harmonic, noise, gain, level, intermodulation distortion, frequency response, relative phase of signals, etc. It is noted that the above-noted sound analyzers and/or speech analyzers can also analyze one or more of the aforementioned parameters. In some embodiments, the audio analyzer is configured to develop time domain information, identifying instantaneously amplitude as a function of time. In some embodiments, the audio analyzer is configured to measure intermodulation distortion and/or phase. In an exemplary embodiment, the audio analyzer is configured to measure signal-to-noise ratio and/or total harmonic distortion plus noise. In an exemplary embodiment, the central processing assembly uses any one or more of the analysis regimes in a comparison process between output from a microphone of a hearing prosthesis and output from a microphone that is not part of the hearing prosthesis, as will be described in greater detail below.

To be clear, in some exemplary embodiments, the central processor apparatus can include a processor that is configured to access software, firmware, and/or hardware that is "programmed" or otherwise configured to execute one or more of the aforementioned analyses. By way of example only and not by way of limitation, the central processor apparatus can include hardware in the form of circuits that are configured to enable the analysis detailed above and/or below, the output of such circuitry being received by the processor so that the processor can utilize that output to execute the teachings detailed herein. In some embodiments, the processor apparatus utilizes analog circuits and/or digital signal processing and/or FFT. In an exemplary embodiment, the analyzer engine is configured to provide high precision implementations of AC/DC voltmeter values, (Peak and RMS), the analyzer engine includes high-pass and/or low-pass and/or weighting filters, the analyzer engine can include bandpass and/or Notch filters and/or frequency counters, all of which are arranged to perform an analysis on the incoming signal so as to evaluate that signal and identify certain characteristics thereof, which characteristics are correlated to predetermined scenarios or otherwise predetermined instructions and/or predetermined indications as will be described in greater detail below. It is also noted that in systems that are digitally based, the central processor apparatus is configured to implement signal analysis utilizing FFT based calculations, and in this regard, the processor is configured to execute FFT based calculations.

In an exemplary embodiment, the central processor is configured to utilize one or more or all of the aforementioned features to analyze the input from the microphones or otherwise analyze the input based on output of the microphones to implement the analyses or otherwise determinations detailed herein according to at least some exemplary embodiments.

In an exemplary embodiment, the central processor apparatus is a fixture of a given building (environmental structure). Alternatively, and/or in addition to this, the central processor apparatus is a standalone portable device that is located in a case or the like that can be brought to a given location. In an exemplary embodiment, the central processor apparatus can be a personal computer, such as a laptop computer, that includes USB port inputs and/or outputs and/or RF receivers and/or transmitters and is programmed as such (e.g., the computer can have Bluetooth capabilities and/or mobile cellular phone capabilities, etc.). Alternatively, or in addition to this, the central processor apparatus is a general electronics device that has a quasi-sole purpose to function according to the teachings herein. In an exemplary embodiment, the central processor apparatus is configured to receive input and/or provide output utilizing the aforementioned features or any other features.

Figure 5:
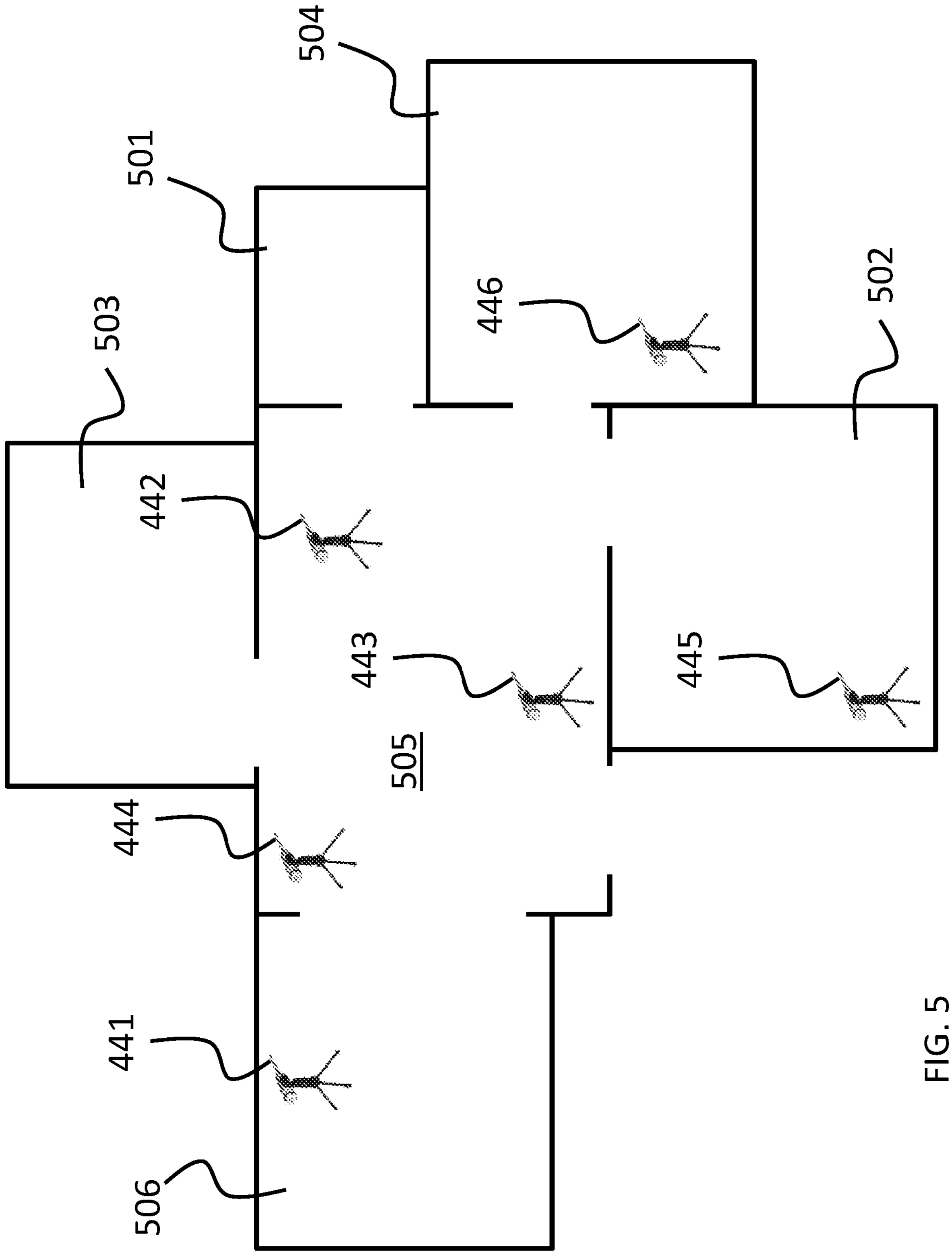
FIG. 5 presents an exemplary arrangement of microphones in a house.

Consistent with the teachings above that there be a plurality of microphone systems "prepositioned" in a building (home, office, classroom, school, etc.), in an exemplary embodiment, FIG. 5 depicts an exemplary structural environment corresponding to a house that includes bedrooms 502, 503, and 504, laundry room 501/utility room 501, living room 505, dining room 506, which represents area(s) in which a human speaker or someone or something that generates sound will be located. In this exemplary embodiment, there are a plurality of microphones present in the environment: a first microphone 441 (a microphone system, but for the purposes of textual economy, the generic phrase "microphone" will be used hereinafter), second microphone 442, a third microphone 443, a fourth microphone 444, a fifth microphone 445, and a sixth microphone 446. In some embodiments, fewer or more microphones can be utilized. In this exemplary embodiment, the microphones are located in a known manner, or at least there is a known correlation between the microphone(s) and the hearing prosthesis, or at least user, which coordinates (and/or correlation) are provided to the central processor apparatus. In other embodiments, the microphone locations are not known to the central processor apparats and/or there is no correlation between the microphones and the microphone of the hearing prosthesis. In an exemplary embodiment, the microphones 44X (which refers to microphones 441-446) include global positioning system components and/or include components that communicate with a cellular system or the like that enable auto positions of these microphones to be determined via the central processor apparatus (or auto correlation with the recipient/hearing prosthesis).

In an exemplary embodiment, the system is configured to triangulate or otherwise ascertain relative locations of the various microphones to one another and/or relative to another component or another actor in the system (e.g., the prosthesis or the recipient, etc.). In an exemplary embodiment, surround sound related technology can be used. In an exemplary embodiment, a speaker is located/placed in a known position and it plays a sound. The microphones measure the direct sound and that reflected back from the walls and then compare their observations to determine their positions relative to one another and the walls of the room. Any device, system and or method that can enable the ascertention of relative locations can be used in some embodiments.

In an exemplary embodiment, the microphones have markers, such as infrared indicators and/or RFID indicators and/or RFID transponders, that are configured to provide an output to another device, such as the central processor apparatus, and/or to each other, that can determine spatial locations of the microphones into one, two and/or three dimensions based on the output, which locations can be relative to the various microphones and/or relative to another component, such as the central processing assembly, or to another component not associated with the system, such as relative to the center of the house, a room where the recipient spends considerable time (e.g., recipient bedroom 502). Still further, in some embodiments, the devices of the microphones can be passive devices, such as reflectors or the like, that simply reflect a laser beam back to an interrogation device, based on the reflection, the device can determine the spatial locations of the microphones relative to each other and/or relative to another point.

In an exemplary embodiment, the system can provide a query to the recipient, such as, a synthetic voice question in the form of "would now be a good time to test the microphones"? This can rely on the recipient's initial training which can be relatively simple training as to when it is good or bad to perform the testing/training on what are good locations and bad locations and when there are no obstacles between microphones and sound sources, etc. Moreover, in an exemplary embodiment, the query could be sent to a caregiver or some other entity. Input could be provided from that entity to implement testing or otherwise prevent testing. Note also that in some exemplary embodiments, the data and comparisons already in place, and the query is in reality a query as to whether or not the entity in question thinks that the test results would be good. Note also that in at least some exemplary embodiments, the recipient can initiate the testing, as noted above.

Some embodiments specifically rely on known distances or otherwise constant distances between sound sources and microphones, etc., while other embodiments specifically do not rely on any knowledge of distance. Note also that in some embodiments, existing sound systems, such as Alexa, can infer a distance and/or directionality, and some embodiments utilize the capabilities of the existing sound systems to achieve distance evaluation and/or locationality. To be clear, in an exemplary embodiment there are devices systems and methods that entail simply utilizing existing functions of commercially available systems to achieve reference data and data associated there with. In this regard, some embodiments include only utilizing readily available output/data from the systems, without altering the existing systems or otherwise creating a new routine for an existing system. Note that this is distinguished from, for example, simply writing a routine that extracts the existing data or the analysis that is already there. By rough analogy, having a professional artist work with an eyewitness to a crime is simply utilizing/extracting data, as compared to placing that witness at a location where that witness can then view the crime or still further by analogy, giving a witness binocular so that the witness can see the activity better. Here, we are taking the "witness" as it is.

As can be seen, in some embodiments, there is utilitarian value with respect to determining the distances between the microphones and sound sources and/or other microphones, etc. In some embodiments, distance values are not utilized in at least some of the methods, devices and systems. In an exemplary embodiment, microphone degradation can offset some frequencies more than others. In some embodiments, knowledge of the distances detailed herein can be utilitarian with respect to the analysis when evaluation/comparison involves a range of frequencies, while in other embodiments, knowledge of the distances may not necessarily be utilized with respect to the analysis when evaluation/comparison involves a range of frequencies. By way of example only and not by way of limitation, taking into account distance can aid in a scenario where microphone degradation has occurred over all frequencies or most frequencies of the microphone, as opposed to a more narrow or limited number of frequencies.

In an exemplary embodiment, a person can move around carrying his or her cell phone/smartphone, and place the phone next to a given microphone, and activate a feature of the phone that will correlate the location of the microphone to a fixed location. By way of example only and not by way of limitation, applications such as smart phone applications that enable the location of a property line of a piece of land to be located relative to positioning of the smart phone can be utilized to determine the position of the microphones, etc. In an exemplary embodiment, a light capture device, such as a video camera or the like that is in signal communication with a processor, can be utilized to obtain images of a room and in an automated and/or a manual fashion (e.g., a person clicks at the location on a computer screen of the microphone), identifies the microphones in the images, and thus extracts the locational data therefrom. Any device, system, and/or method that can enable the position location of the microphones to be determined to enable the teachings detailed herein can be utilized in at least some exemplary embodiments. In an exemplary embodiment, image recognition systems are utilized to determine or otherwise map microphone placement.

That said, in some embodiments, positioning information is not needed or otherwise is not utilized to implement some of the teachings.

In an exemplary embodiment, microphones 44X are in wired and/or wireless communication with the central processor apparatus.

It is noted that while the embodiments detailed herein have focused on about 6 or fewer sound capture devices/microphones, in an exemplary embodiment, the teachings detailed herein can be executed utilizing 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, or 50, or 60, or 70, or 80, or 90, or 100 microphones (here, an individual microphone, where, for example, three omnidirectional microphone systems at different locations, each having three individual microphones, would have a total of 9 microphones) and/or microphone systems (e.g., in the last example, three systems or more, or any value or range of values therebetween in increments of 1), which microphones/microphone systems can be utilized to capture an audio environment all simultaneously or only some of them simultaneously. In an exemplary embodiment, some of the microphones/microphone systems can be statically located in the sound environment during the entire period of sound capturing, while others can move around or otherwise be moved around. Indeed, in an exemplary embodiment, one subset of microphones remains static during the sound capturing while other microphones are moved around during the sound capturing.

It is noted that in at least some exemplary embodiments, sound capturing (the capture of sufficient amount of sound that can enable the teachings herein, sometimes referred to as sampling) can be executed once every or at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, or 50, or 60, or 70, or 80, or 90, or 100 (or any number therein in increments of 1) seconds, minutes, or any variation thereof or any range therebetween in 0.01 second increments, during a given temporal period, and in some other embodiments, sound capture can occur continuously for or for at least 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40, or 50, or 60, or 70, or 80, or 90, or 100 (or any number therein in increments of 1) seconds or minutes or hours or days. In some embodiments, the aforementioned sound capture is executed utilizing at least some microphones (including microphone systems) that remain in place and are not moved during the aforementioned temporal periods of time. In an exemplary embodiment, every time sound capturing is executed, one or more or all of the method actions detailed herein can be executed based thereon. That said, in an exemplary embodiment, the captured sound can be utilized as an overall sample and otherwise statistically managed (e.g., averaged) and the statistically managed results can be utilized in the methods herein. In an exemplary embodiment, other than the microphone(s) of the hearing prosthesis and/or the microphones of the smart phone(s) or other portable phones, the remaining microphones remain in place and otherwise are static with respect to location during a given temporal period such as any of the temporal periods detailed herein. In an exemplary embodiment, a microphone system or the like can be placed at a given location within a room, such as on a countertop or a night bureau, where that microphones of that system will be static for the given temporal period. Note also that static position is relative. By way of example, a microphone that is built into a car or the like is static relative to the environmental structure of the car, even though the car can be moving. (This would not be a "globally static microphone," but a locally static microphone.) To be clear, in at least some embodiments, while the teachings detailed herein have generally focused on buildings and the like, the teachings detailed herein are also applicable to automobiles or other structures that move from point to point. In this regard, it is noted that in at least some embodiments of automobiles and/or boats or ships and/or buses, or other vehicles, etc., there are often one or more built-in microphones in such apparatuses. For example, cars often have hands-free microphones, and in some instances, depending on the number of riders and the like, there can be one or two or three or four or five or six or more mobile phones in the vehicle and/or one or two or three or more personal electronics devices or one or two or three or more laptop computers, etc. In an exemplary embodiment, more than 90, 80, 70, 60, or 50% of the microphones remain static and are not moved during the course of the execution of the methods herein. Indeed, in an exemplary embodiment, such is concomitant with the concept of capturing sound at the exact same time from a different number of locations that are known. To be clear, in at least some exemplary embodiments, the methods detailed herein are executed without someone moving a microphone from one location to another. The teachings detailed herein can be utilized to establish a sound field in real-time or close thereto by harnessing signals from multiple mics in a given sound environment. The embodiments herein can provide the ability to establish a true sound field, as opposed to merely identifying the audio state at a single point at a given instant.

Some methods rely on the ability to repeatedly sample an acoustic environment from static locations that remain constant.

In an exemplary embodiment, methods, devices, and systems detailed herein can include continuously sampling an audio environment. By way of example only and not by way of limitation, in an exemplary embodiment, the audio environment can be sampled utilizing a plurality of microphones, where each microphone capture sound at effectively the exact same time, and thus the samples occur effectively at the exact same time. In some embodiments, the sampling is not continuous, but instead is executed when instructed (whether the instructions are automated or manually initiated—more on this below).

In an exemplary embodiment, the central processor apparatus is configured to receive input pertaining to a particular feature of a given hearing prosthesis. By way of example only and not by way of limitation, such as in the exemplary embodiment where the central processor apparatus is a laptop computer, the keyboard can be utilized by a recipient to input such input. Alternatively, and/or in addition to this, a graphical user interface can be utilized in combination with a mouse or the like and/or a touchscreen system so as to input the input pertaining to the particular feature of the given hearing prostheses. In an exemplary embodiment, the central processor apparatus is also configured to collectively evaluate the input from the plurality of sound capture devices.

Consistent with the teachings above, as will be understood, in an exemplary embodiment, the system can further include a plurality of microphones/microphone systems spatially located apart from one another. In an exemplary embodiment, one or more or all of the microphones/microphone systems are located less than, more than or about equal to X meters apart from one another and/or from the microphone of the hearing prosthesis, where, in some embodiments, X is 0.1, 0.2, 0.3, 0.4, 0.5, 0.75, 1, 1.5, 2, 2.5, 3, 3.5, 4, 4.5, 5, 6, 7, 8, 9, 10, 11, 12, 13, 14, 15, 16, 17, 18, 19, 20, 21, 22, 23, 24, 25, 26, 27, 28, 29, 30, or more or any value or range of values therebetween in 0.01 increments (e.g., 4.44, 45.59, 33.33 to 36.77, etc.).

In an exemplary embodiment, consistent with the teachings above, the microphones are configured to output respective signals indicative of respective captured sounds. The system is further configured to provide the respective signals and/or modified signals based on the respective signals to the central processor apparatus as input from the plurality of sound capture devices.

Figure 6:
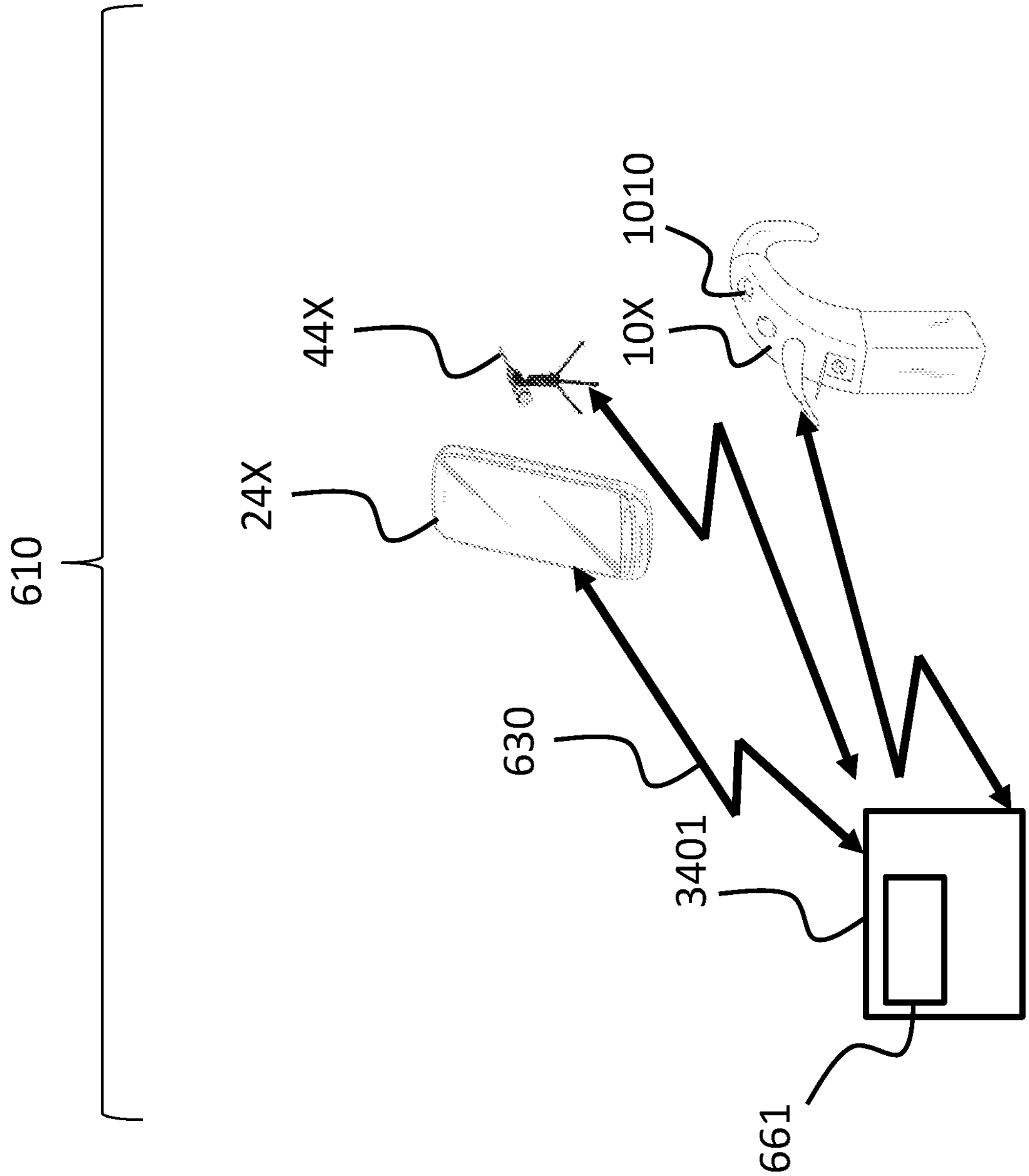
FIG. 6 presents another exemplary system according to an exemplary embodiment.

Consistent with the teachings above, embodiments include a system 410 of FIG. 4A, or system 610 of FIG. 6, where various separate consumer electronics products 44X that include microphones are in signal communication with the central processor apparatus 3401 via respective links 630. In an exemplary embodiment, the microphones of a given system can be microphones that are respectively part of respective products having utility beyond that for use with the system. By way of example only and not by way of limitation, in an exemplary embodiment, the microphones can be microphones that are parts of household devices (e.g., an interactive system such as Alexa, etc.), or respective microphones that are parts of respective computers located spatially throughout the house (and, in some embodiments, the microphones can correspond to the speakers that are utilized in reverse, such as speakers of televisions and/or of stereo systems) that are located in a given house at locations known to the central processor apparatus (relative or actual), and/or can be parts other components of an institutional building (school, theater, church, etc.).

In an exemplary embodiment, the cellular systems of the cellular phones 240 can be utilized to pinpoint or otherwise determine the relative location and/or the actual locations of the given cell phones, and thus can determine the relative locations and/or actual locations of one or more microphones of a given system. Such can have utilitarian value with respect to embodiments where the people who own or otherwise possess the respective cell phones will move around or otherwise not be in a static position or otherwise will not be located in a predetermined location.

In an exemplary embodiment, the embodiment of FIG. 6 utilizes a Bluetooth or the like communication system. Alternatively, and/or in addition to this, a cellular phone system can be utilized. In this regard, the link 630 may not necessarily be a direct link. Instead, by way of example only and not by way of limitation, the link can extend through a cellular phone tower or a cellular phone system or the like. Of course, in some embodiments, the link can extend through a server or the like such as where the central processor apparatus is located remotely, geographically speaking, from the structure that creates the environment, which structure contains the sound capture device.

Still further, as can be seen, at least one microphone will be that of a sound capture device of a hearing prosthesis of given person 10X, where correlations can be made between the inputs therefrom according to the teachings herein and/or other methods of determining location. In some embodiments, the hearing prosthesis can be configured to evaluate data based on the sound captured by the system so that the system can operate based on the evaluation. For example, as with the smart phones, etc., the hearing prosthesis can include and be configured to run any of the programs for analyzing sound detailed herein or variations thereof, to extract information from the sound. Also, sound processing capabilities of a given hearing prosthesis can be included in the other components of the systems herein. Indeed, in some aspects, other components can correspond to sound processors of a hearing prosthesis except where the processors are more powerful and/or have more access to more power.

FIG. 6 further includes a feature of the display 661 that is part of the central processor apparatus 3401. That said, in an alternative embodiment, the display can be remote or otherwise be a separate component from the central processor apparatus 3401. Indeed, in an exemplary embodiment, the display can be the display on the smart phones or otherwise the cell phones 240, or the display of a television in the living room, etc. Thus, in an exemplary embodiment, the system further includes a display apparatus configured to provide data/output according to any of the embodiments herein that have output, as will be described below.

It is noted that while the embodiments detailed herein depict two-way links between the various components, in some embodiments, the link is only a one-way link. By way of example only and not by way of limitation, in an exemplary embodiment, the central processor apparatus can only receive input from the smart phones, but cannot output such input thereto.

Figure 7:
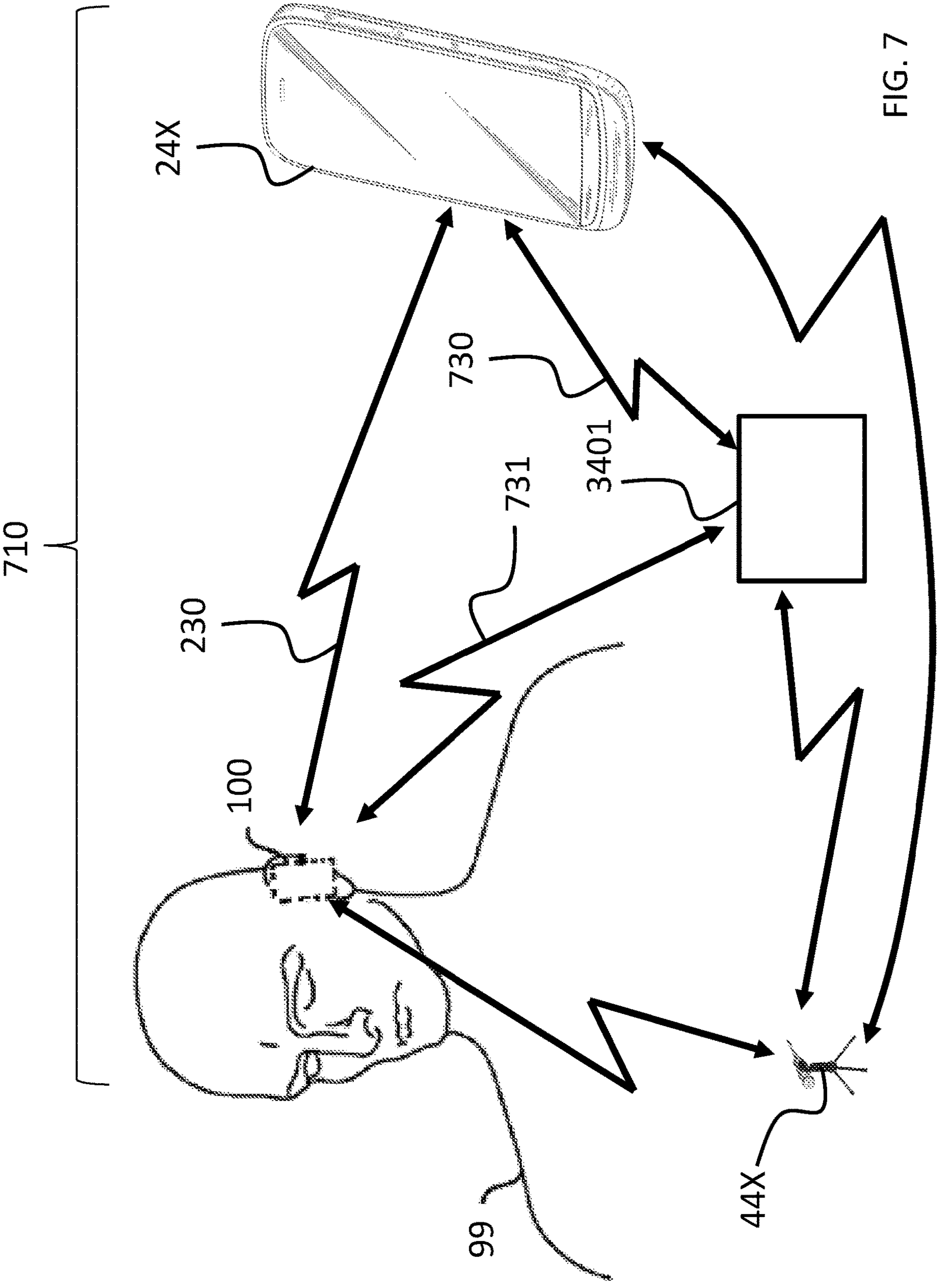
FIG. 7 presents another exemplary system according to an exemplary embodiment.

It is noted that while the embodiments of FIGS. 4A-6 have focused on communication between the sound capture devices and the central processing assembly or communication between the sound capture devices and the hearing prostheses, embodiments further include communication between the central processing assembly and the prostheses. By way of example only and not by way of limitation, FIG. 7 depicts an exemplary system, system 710, which includes link 730 between the cell phone 24X and the central processing assembly 3401. Further, FIG. 7 depicts link 731 between the central processor apparatus 3401 and the prosthesis 100. The ramifications of this will be described in greater detail below. However, in an exemplary embodiment, the central processor apparatus 3401 is configured to provide, via wireless link 730, an RF signal and/or an IR signal to the prosthesis 100 indicating the spatial location that is more conducive to hearing. In an exemplary embodiment, the prosthesis 100 is configured to provide an indication to the recipient indicative of such. In an exemplary embodiment, the hearing prosthesis 100 is configured to evoke an artificial hearing percept based on the received input.

Note also, as can be seen, a microphone system 44X is in communication with the central processor apparatus 3401, the prosthesis 100, and the smart phone 24X.

Figure 8:
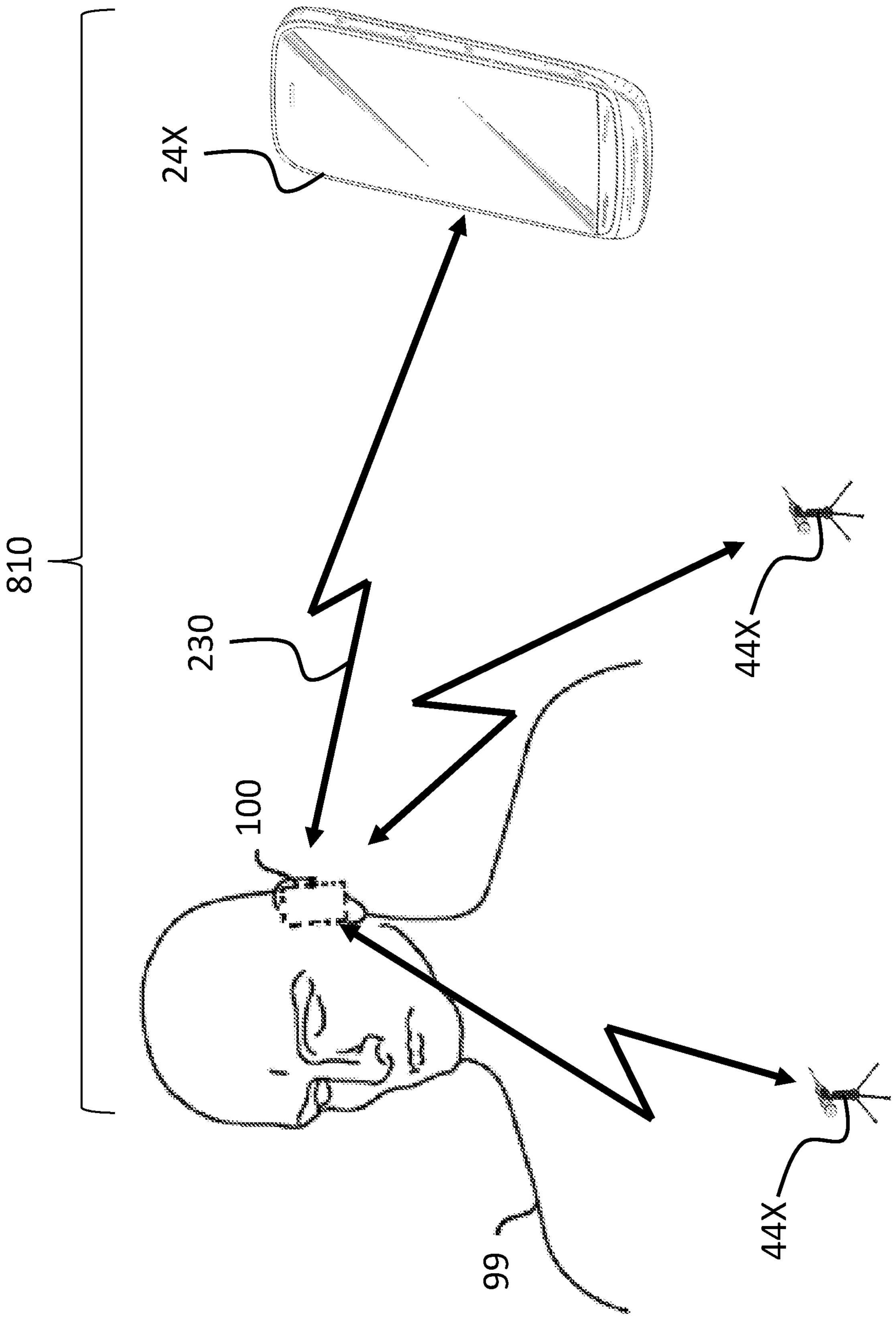
FIG. 8 presents another exemplary system according to an exemplary embodiment.

FIG. 8 depicts an alternate exemplary embodiment where the central processing apparatus is part of the hearing prostheses 100, and thus the sound captured by the microphones or otherwise data based on sound captured by the various microphones of the system are ultimately provided to the hearing prostheses 100. Again, it is noted that embodiments can also include utilizing microphones and other devices in vehicles, such as cars, etc., and can utilize the built-in microphones of such.

Figure 9:
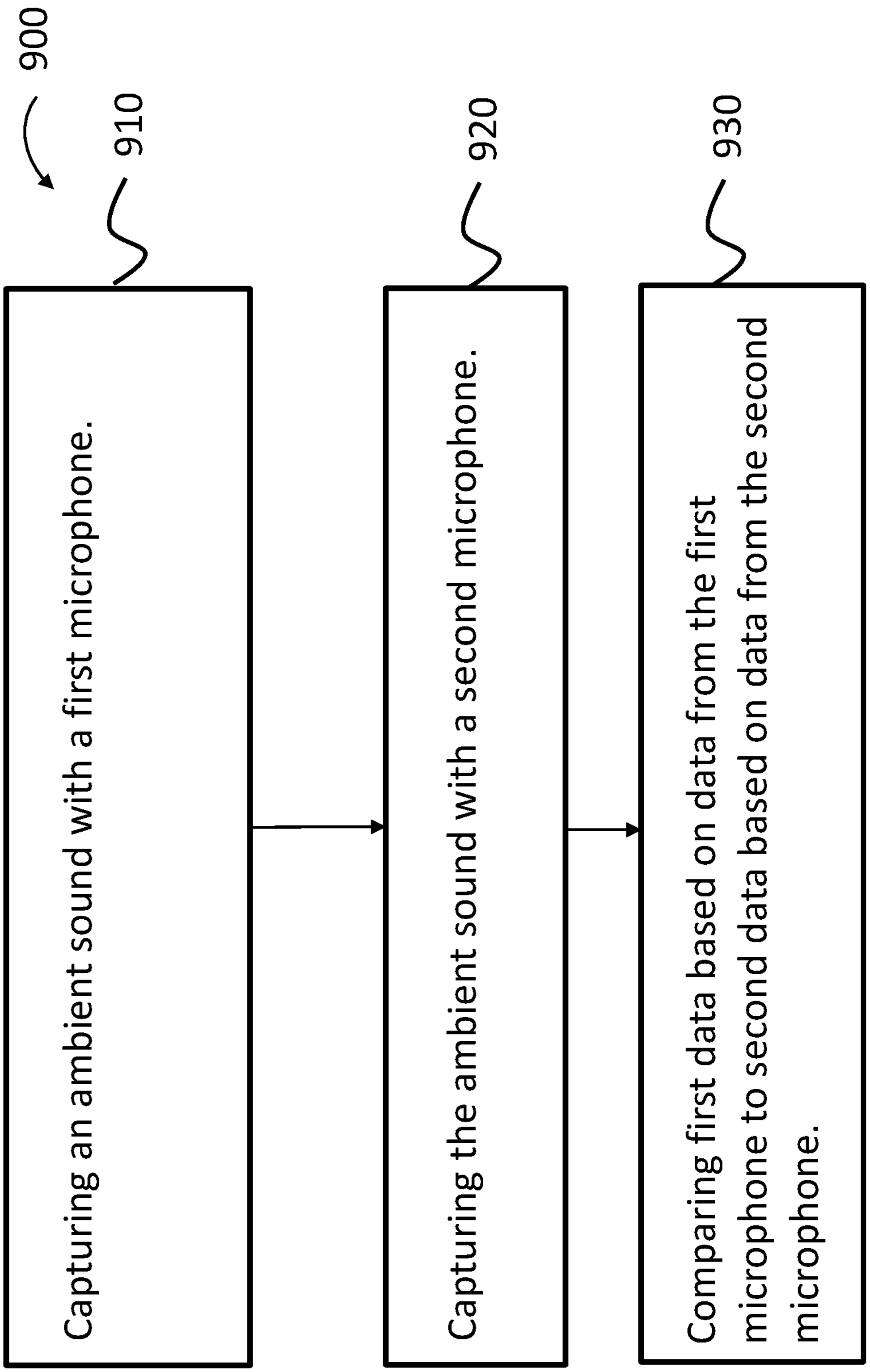
FIGS. 9-15 present exemplary flowcharts for exemplary methods.

FIG. 9 presents an exemplary flowchart for an exemplary method, method 900, according to an exemplary embodiment. Method 900 includes method action 910 which includes capturing an ambient sound with a first microphone. In this exemplary embodiment, the first microphone can be part of a hearing prostheses, such as the microphone of a behind the ear device. That said, in an exemplary embodiment, the microphone can be the microphone of the smart phone or a remote microphone of the hearing prostheses, where, in some embodiments, these separate microphones are utilized by the hearing prosthesis to capture sound and to base a hearing percept evoked by the hearing prosthesis based thereon. Method 900 further includes method action 920, which includes capturing the ambient sound with a second microphone. In an exemplary embodiment, the second microphone can be a single microphone or can be a microphone system or sub-system, such as the Alexa microphone system, which can have up to nine microphones in a given Alexa device. Accordingly, in an exemplary embodiment, method action 920 can be executed by utilizing an indoor microphone (as distinguished from, for example, a microphone of a cell phone—more on this below). Thus, in an exemplary embodiment, the second microphone is part of an indoor sound capture system or indoor sound capture sub-system (the former could be a dedicated microphone, such as, for example, an omnidirectional office microphone, and, with respect to the latter, the microphone subsystem of, for example, the Alexa device). It is briefly noted that an indoor sound capture system/indoor microphone can be a microphone that is usable on pseudo-outdoor areas, such as, for example, on balconies, gazebos, smoking areas, etc.

In an exemplary embodiment, method 900 further includes method action 930, which includes comparing first data based on data from the first microphone to second data based on data from the second microphone. In an exemplary embodiment, method action 930 can be executed by any of the processors and/or processor apparatus 3401. Indeed, in an exemplary embodiment, method 900 is executed utilizing the system of FIG. 4E. It is noted that while in some embodiments of method 900, a high-quality microphone/microphone system 440 is utilized, in other embodiments, a medium quality or even a low-quality microphone might instead be used. More on this below. However, in some embodiments, the sound capture system or sound capture sub-system is part of a household consumer product with a high-performance microphone system (e.g., that in Alexa, that in a high-quality conference room teleconference system, etc.).

Figure 10:
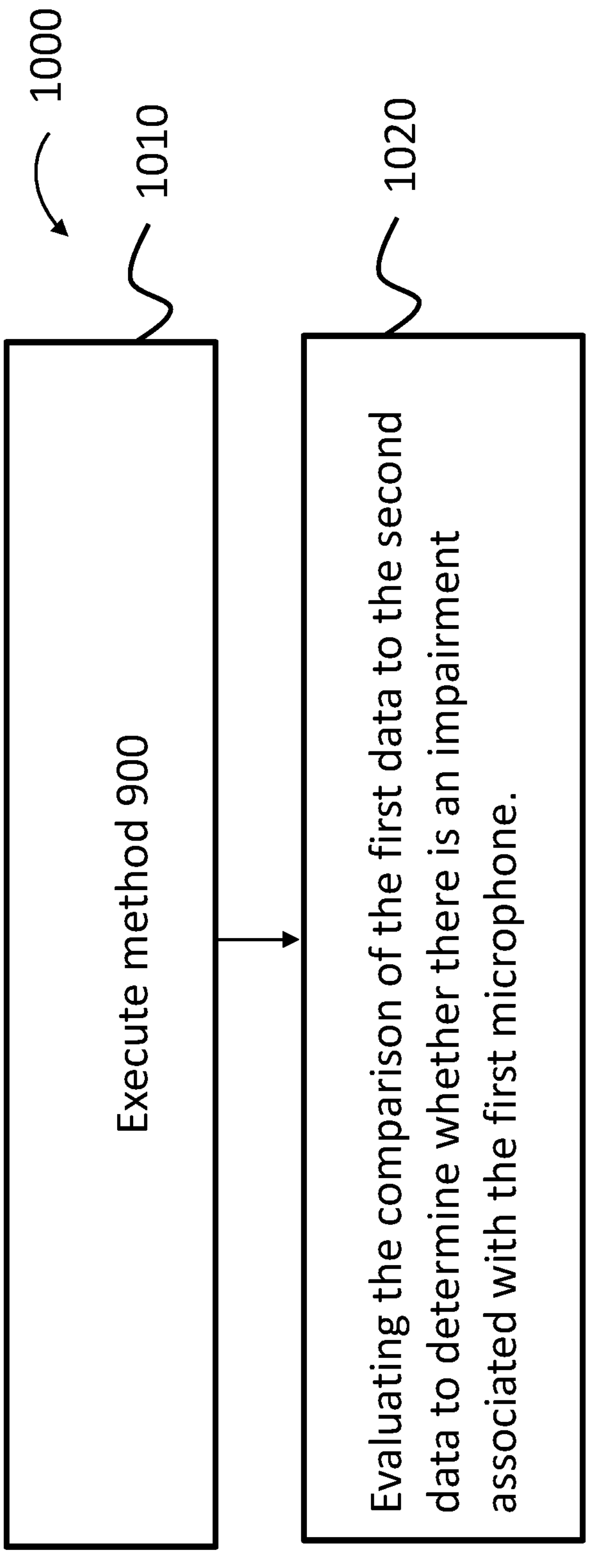

FIG. 10 depicts a flowchart for another exemplary method, method 1000, which includes method action 1010, which includes executing method 900. Method 1000 further includes method action 1020, which includes evaluating the comparison of the first data to the second data to determine whether there is an impairment associated with the first microphone.

Figure 11:
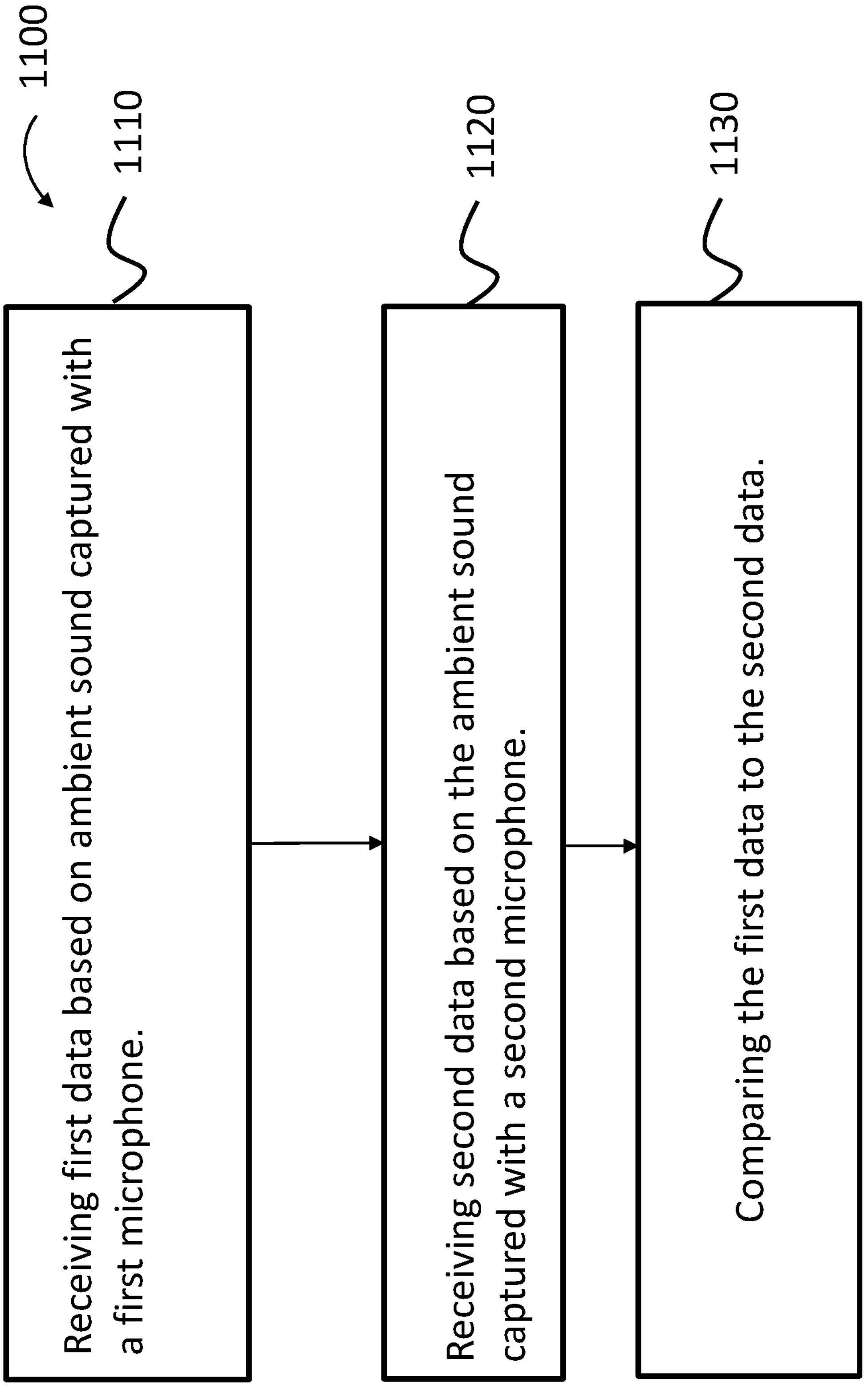

FIG. 11 presents another exemplary flowchart for another exemplary method, method 1100. Here, method 1100 is a method that is based on analyzing data from the various microphones and does not require the action of capturing the sound with a microphone (this would be done by another actor, in some embodiments). Accordingly, method 1100 is broader than method 900. By way of example only and not by way of limitation, method 1100 can be executed solely by a processing apparatus 3401. Still with reference to FIG. 11, method 1100 includes method action 1110, which includes receiving first data based on ambient sound captured with a first microphone, and method action 1120, which includes receiving second data based on the ambient sound captured with a second microphone. In this exemplary embodiment, the first microphone and the second microphone can be the microphones just detailed above. In this embodiment, there is ambient sound that is captured by the given microphones, and the microphones output a signal, and the respective signals can be the first data and the second data, or the signals can be processed or manipulated or utilized to output another signal, or otherwise to create respective data packages/packet, which can be the first data and the second data.

Method 1100 further includes method action 1130, which includes the action of comparing the first data to the second data.

Consistent with the teachings detailed above, in an exemplary embodiment, the various microphones can be utilized to sample the audio environment, and thus capture sound accordingly.

Figure 12:
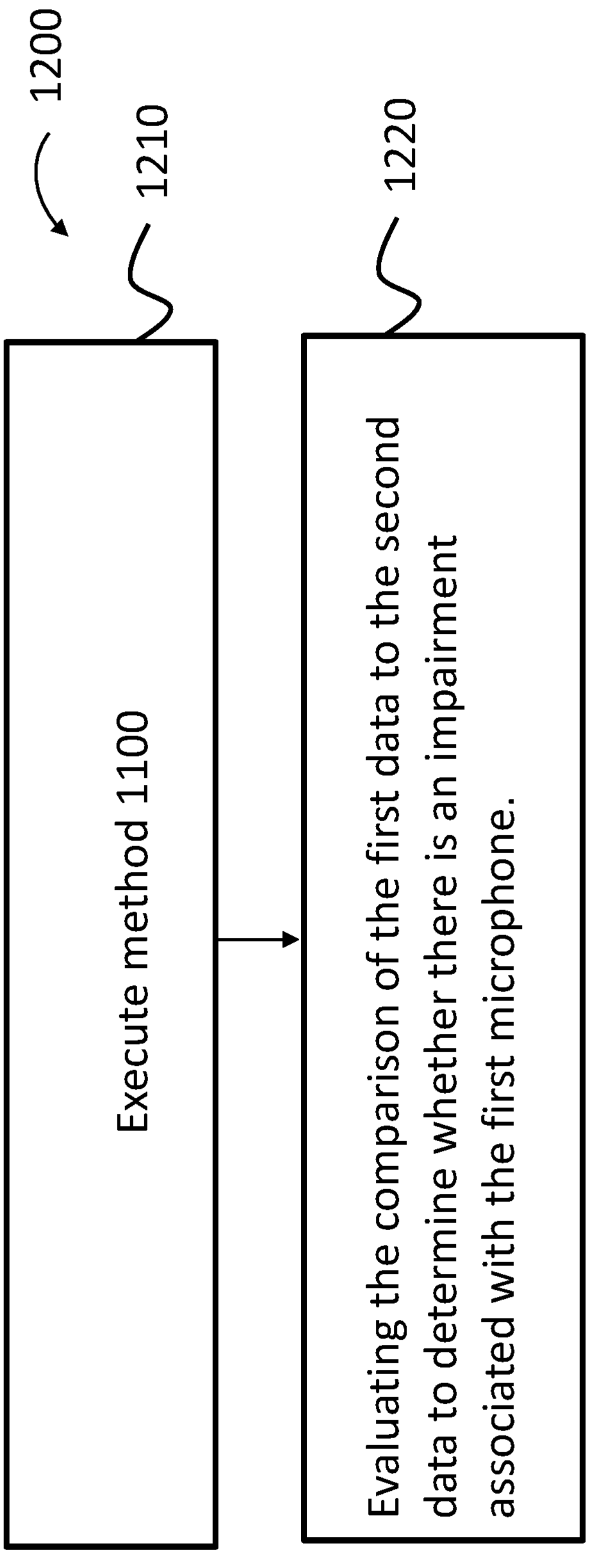

FIG. 12 presents an exemplary flowchart for an exemplary method, method 1200, which includes method action 1210, which includes executing method action 1100, and method action 1220, which includes evaluating the comparison of the first data to the second data to determine whether there is an impairment associated with the first microphone.

As can be seen from methods 1100 and 1200, the first and second data must be based on ambient sound captured with the respective microphones, which means that the first and second data must be based in some part on the output of the first and second microphones. Also, the ambient sound must be the same sound, as can be seen from the language of methods 1100 and 1200.

In an exemplary embodiment, there is a non-transitory computer-readable media having recorded thereon, a computer program for executing at least a portion of a method, such as any of those detailed above, the computer program including code for obtaining first data based on data based on ambient sound captured with a first microphone, code for obtaining second data based on data based on the ambient sound captured with a second microphone and code for comparing the first data to the second data, wherein the first microphone is a part of a hearing prosthesis, the second microphone is part of an indoor sound capture system or indoor sound capture sub-system, and the method further comprises comparing the first data to the second data.

Figure 13:
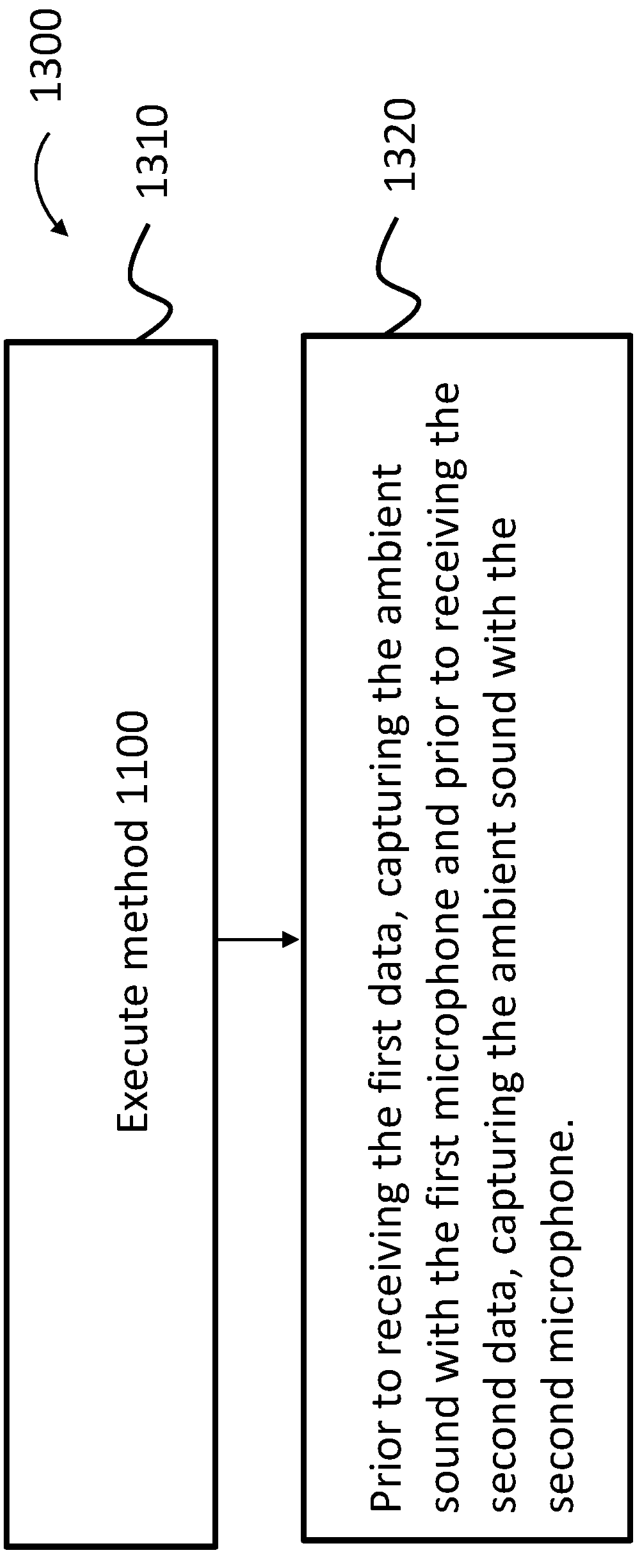

Any disclosure herein of a method action corresponds to an alternate disclosure of code for executing that method action, and vis-a-versa. FIG. 13 presents an exemplary flowchart for an exemplary method, method 1300, which bridges the gap between method 900 and method 1100. Here, method 1300 includes method action 1310, which includes executing method 1100. Method 1300 also includes method action 1320, which includes the actions of, prior to receiving the first data, capturing the ambient sound with the first microphone, and prior to receiving the second data, capturing the ambient sound with the second microphone.

It is noted that while the methods contemplate capturing the sound utilizing the hearing prostheses and the microphone(s) of the system separate from the hearing prostheses simultaneously, so that data based on the same sounds can be compared to one another, it is noted that the actions the methods detailed herein regarding the analysis and/or the receipt of the data the not occur simultaneously. By way of example only and not by way of limitation, the hearing prostheses and/or the microphone system of the components separate from the hearing prostheses need not be in signal communication with the processor apparatus 3401 all the time or even at the time that the sound captured. In an exemplary embodiment, the prostheses and/or the microphone of the components separate from the prostheses can record the data from the microphones and time log or otherwise timestamp the data. At some point in the future, perhaps minutes or hours or days or even weeks after the capturing of the sound, one or both of the data sets could then be uploaded to the processor apparatus 3401 for the comparisons. Alternatively, the data can be uploaded to another device, and then provided to yet another device to a later date so that the comparison and/or evaluation could take place later, such as where the comparison program is located on a server on a computer separate from the data storage area.

The ability to upload data at different temporal periods and then evaluate the data at different temporal periods enables a relatively large amount of data to be analyzed over a large period of time without requiring constant communication between the various components. This can reduce the amount of battery power, for example, that is consumed by the hearing prostheses vis-à-vis data transfer. Indeed, in an exemplary embodiment, data transfer can take place at night, for example, when the hearing prosthesis is not being utilized or otherwise during recharging. Alternatively, and/or in addition to this, data transfer can take place during periods where the hearing prostheses is hardwired to a computer or the like for data transfer purposes, such as so as to receive upgrades or otherwise to perform other diagnostic routines. All this said, in some embodiments, the data is transferred to the processor apparatus 3401 or other device in real time or near real time, and the analysis can take place relatively swiftly, such as in real time or near real time.

In an exemplary embodiment, concomitant with the teachings detailed above, the raw signal from the microphone of the BTE device 100 can be output to/received by the processor apparatus 3401 and/or a modified signal and/or a signal based on the signal from the microphone of the BTE device 100 is outputted to/received by the processor apparatus. In a similar vein, the raw signal(s) from the microphone(s) 440 can be output to/received by the processor apparatus 3401 and/or a modified signal or a plurality of modified signals and/or a signal or signals based on the signals from the microphone(s) of 440 can be output to/received by the processor apparatus 3401. In an exemplary embodiment, a signal based on the output from one or more of the microphones can be a signal that includes characteristics of the signal output by the microphone (frequency data, amplitude, etc.). In an exemplary embodiment, the signal(s) provided to the processor apparatus 3401 can be digital signals, and thus the system can include analog to digital converters or the like. Any signal/data that is based upon the output of one or more of the microphones of any given component of the system can be utilized in at least some exemplary embodiments.

In an exemplary embodiment, the actions of capturing the ambient sound with the first microphone and the second microphone and the action of comparing the first data to the second data and/or the actions of receiving the first data and the second data and analyzing or otherwise comparing the first and second data are executed automatically. By way of example only and not by way of limitation, in an exemplary embodiment, the system that is utilized to execute method 900 can be a system that is configured to execute the method at a given time, automatically. By way of example only and not by way of limitation, the system can be preprogrammed to execute method action 1100 and/or method action 1200. That said, in an exemplary embodiment, a system controller or the like, such as one that is based in the processor apparatus 3401 or another controller, can be utilized to coordinate and initiate the actions of methods 900 to 1200. By way of example only and not by way of limitation, a controller could activate one or more of the microphones/initiate sound capture by one or more of the microphones and then execute the comparison/analysis of these methods. That said, by way of example, method action 910 and/or method action 920, can be ongoing irrespective of any control from a central control unit, which would be the case, for example, where the recipient of the hearing prosthesis is in a room with, for example, and Alexa system, both of which are activated and operating. In this regard, the system can automatically execute method action 930 or 1020 for example.

In an exemplary embodiment, the comparison actions and/or the evaluation actions can be executed by the hearing prosthesis. Again, in some embodiments, the action of comparing the first data to the second data and/or the action of evaluating is executed automatically. In some embodiments, the action of comparing the first data to the second data and/or the evaluation actions are executed by a system of which the hearing prosthesis is a part (e.g., by the smart phone). In some embodiments, the system is configured to automatically determine a utilitarian temporal period to execute the comparison.

In this regard, in an exemplary embodiment, any part of the hearing prosthesis with a system of which the hearing prosthesis is a part can analyze input from one or more of the components, whether that is input from the hearing prostheses, such as from the hearing prostheses microphones or input from one or more of the indoor microphones. In an exemplary embodiment, the system can analyze the input and determine whether or not it is a utilitarian time to execute one or more of the method actions herein. In this regard, in some embodiments, the determination of whether or not it is utilitarian time may include simply determining that the sound that is captured by the microphones, or more accurately, that the data based on the sound captured by the microphones, is data that should be utilized, as opposed to data that should not be utilized or otherwise will not be utilized. This is because in some embodiments, the sound capture and/or data collection can be ongoing and is done as part of other methods that have nothing to do with methods 900 to 1200, because the microphones of the indoor microphone system or subsystem are utilized for other purposes, and the microphone(s) of the hearing prosthesis is utilized for hearing prostheses purposes.

Accordingly, in an exemplary embodiment, there is a hearing prosthesis and/or a component of a hearing prosthesis system that is configured to execute one or more of the method actions detailed herein. In an exemplary embodiment, the above comparisons can be a test of the first microphone based solely on the first data and the second data (i.e., no other data is used). In an alternate embodiment, other data, such as data relating to prior test data, or known transfer functions, can be used.

An exemplary utility of one or more of the methods detailed herein can entail determining whether or not the microphone(s) of the hearing prostheses are adequately functioning. In this regard, for example, over time the BTE microphone and the microphone cover (or other microphone and/or cover of an alternate embodiment, such as the sound processor or removable component of a bone conduction device, etc.) can cause degradation in the sound that is to be processed by the hearing prosthesis. As the degradation is gradual, the recipient may not be aware of it or be aware of the extent to which it is affecting their speech understanding or other hearing perceptions (e.g., the analogy of slowly increasing water temperature to a boil—a hopping entity in the water might not notice it, at least until it is very bad). Corollary to this is that microphones degrade for different people at different rates. Thus, there is no true foolproof, or even satisfactory, way to forecast microphone degradation. The teachings detailed herein can, in at least some exemplary embodiments, avoid, ameliorate or otherwise get around these problems.

As distinct from microphone degradation, there can be other phenomena that impact sound capture performance, such as structural degradation and/or fouling. In some prior art regimes, one way of solving this problem can be to routinely replace the microphone cover at a certain time. This can result in unnecessary expenses and/or might not provide an optimal replacement regime. In an exemplary embodiment, the hearing prostheses according to the embodiments herein are used with the methods detailed herein such that the microphones and/or the covers thereof are only ever replaced when the methods determine that there is a problem with the microphone and/or cover. That is, the methods can, in some embodiments avoid routine replacement, at least within a period of at least 0.25, 0.5, 0.75, 1, 1.25, 1.5, 1.75, 2, 2.5, 3, 3.5, 4, 4.5, 5, 5.5, 6, 6.5, 7, 7.5 8, 9 or 10 years or any value or range of values therebetween in 0.1 year increments.

Another way of solving or ameliorating the problem is by comparing the spectrum from different microphones of a given hearing prosthesis (some hearing prostheses have two or more microphones). However, this cannot and does not address the scenario where the microphone covers under the microphones degrade at the same rate or relatively similar rate. Yet another way of solving the above problem is by comparing a long-term spectrum over time. This is based on the assumption that the long-term sound environment for a recipient is generally the same. If this is not the case, this test also becomes unreliable. In some embodiments of the teachings detailed herein, there is no comparison of data from one microphone of the hearing prostheses and/or that is part of a system thereof to that of another microphone the hearing prostheses and/or that is part of the system thereof. Still further, in some exemplary embodiments, there is no comparison of long-term spectrum over time. In some embodiments, the comparisons are executed based on data that was obtained over a period that is less than five, four, three, two, or one days, or less than five, three, four, two, or one hours or less than five, four, three, two, or one minutes, etc.

In some embodiments, there is no reliance on long term monitoring of a naturally occurring acoustic signal and/or an artificially generated acoustic signal and/or no reliance on detecting changes in the signal (natural or artificial) in regard to a prior time and/or no reliance on the ability to generate a specific signal from a device in a known spatial relationship to the hearing prosthesis and then comparing the device response against a reference signal or a reference recording of that signal. In some embodiments, is no reliance on monitoring of any of the aforementioned signals beyond the period that is more than 10, 20, 30, 40, 50, 60, 70, 80, 90, 100 seconds, or minutes, or hours, or days, or weeks, or any value or range of values therebetween in respectively 1 second or minute or hour or day or week intervals (e.g., 22 days, 34 minutes, 92 minutes to 94 weeks, etc.).

In at least some embodiments, where embodiments herein differ from the aforementioned prior art methods is the use of naturally occurring signals/acoustic sounds while using a commercial microphone system, such as a microphone array, to provide a reference recording. In addition to the reference microphone array, there can be a system that is configured to determine the position of the signal source in relation to the hearing prostheses, or at least a recipient thereof, and compensate for things like distance, etc. Here, the teachings herein can rely on high performance microphone arrays in people's houses or buildings, etc., such as, for example, example Amazon Echo, Google Home, etc. These systems allow apps to be written for the system, such as, for example, Alexa skills, and thus apps for these systems can be written in some embodiments for us with the devices and methods disclosed herein. Thus, some embodiments involve utilizing these home systems and the sound processor/hearing prosthesis in combination to test the hearing prosthesis microphones.

It is noted that any method action detailed herein corresponds to a corresponding disclosure of a computer code for executing that method action, providing that the art enables such unless otherwise noted. In this regard, any method action detailed herein can be part of a non-transitory computer readable medium having recorded thereon, a computer program for executing at least a portion of a method, the computer program including code for executing that given method action. The following will be described in terms of a method, but it is noted that the following method also can be implemented utilizing a computer code.

With respect to computer programs, in some embodiments, there is a non-transitory computer-readable media having recorded thereon, a computer program for executing at least a portion of a method of executing the comparison action and/or evaluation actions detailed herein, if not more actions in some embodiments. The computer program including, for example, code for obtaining the first data, code for obtaining the second data, code for comparing the first data to the second data and/or code for generating an alert to a recipient of the hearing prosthesis and/or a healthcare provider or some other entity indicative of a conclusion based on the comparison. In an exemplary embodiment, this can entail notifying the recipient that the microphone has degraded. This can be done by any viable arrangement, such as, for example, by a service provider notifying the recipient by mail (regular and/or email) and/or a caregiver or guardian of the recipient, etc. A notification can be present on the website that the user/recipient utilizes in conjunction with his or her hearing prosthesis. An audible notification can be provided to the recipient via the hearing prosthesis, such as by way of a synthetic sound (a series of beeps or some other audible signal, or a synthesized human voice stating something along the lines such as "microphone degradation identified, consult your user account for further additional details). A visual indicator could be provided, such as a beeping light that indicates some form of malfunction or otherwise indicates that some form of maintenance should be executed, which could be in the form of a code that would provide meaning to the recipient as differentiated from other codes, or could be a general indication indicating the recipient that the recipient should check his or her account for updated details. In a further embodiment, an automatic procedure can be executed which will deliver the recipients of a new microphone cover or even potentially a new microphone that can replace the old microphone.

Thus, in an exemplary embodiment, there is a system, such as any of the systems detailed herein and/or variations thereof, that is configured to determine the state of the sound capture performance as detailed above, or such includes determining that hearing prosthesis microphone degradation has occurred.

In an exemplary embodiment, the data herein can correspond to respective inputs into the central processor apparatus. In an embodiment, the input can be tagged or otherwise include a code that indicates where and/or when the data was ultimately received and/or acquired. Alternatively, and/or in addition to this, the central processor apparatus can be configured to evaluate the ultimate source of the data based on an input line relative to another input line of the system, etc. In at least some exemplary embodiments, the teachings detailed herein include utilization of any of the associated data to implement at least some of the analysis and/or evaluations detailed herein. For example, the source of the data can be utilized in some embodiments, as will be described in greater detail below, where the location of the recipient relative to a sound source and/or a high-quality microphone or microphone other than the microphone of the hearing prostheses is utilized. The tagging or other metadata associated with the received data be used in a sub algorithm to determine or otherwise evaluate the locations.

By data based on data, it is meant that this can be the raw output signal from the microphone, or can be a signal that is generated that is based on the signal from the microphone, or can be a synopsis or a summary, etc., of the raw output from the microphone. Thus, data based on data can be the exact same signal or can be two separate signals, one that is based on the other. The method actions detailed herein can be executed in accordance with any of the teachings detailed herein. Again, lookup tables or preprogrammed logic or even artificial intelligence systems can be utilized to implement various method actions. The programming/code can be located in hardware, firmware and/or software.

A smart home system and the hearing prosthesis can, in some embodiments, simultaneously monitor external sounds, people speaking, a television, a radio, etc., and compare the signals/characteristic(s) of the signals from the microphones, such as frequency responses. This comparison could use the known specification of each microphone system to model the expected differences between the frequency responses or it would use a reference characterization taken when the processor is new or had recently been serviced for doing the comparison. By way of example only and not by way limitation, suppliers of microphones often provide data sheets or otherwise information about the performance aspects of a given microphone. In some embodiments, this is from testing the microphone when it is new or otherwise prior to shipping from the factory where the microphone is made or proximate packaging of the microphone or on packaging of the microphone for that matter. In other embodiments, this is from specifications that are not tied to testing the specific microphone per se, but are indicative of the performance of the microphone (e.g., by analogy, the miles per gallon sticker on the car is not based on testing of that specific car, based on data indicative of how that car will perform in a specifically significant matter). In an exemplary embodiment, frequency responses for a given microphone can be provided from the manufacturer of the microphone or obtain from another source. In an exemplary embodiment, data associated with microphone can entail a voltage level at different frequencies for a given input. In an exemplary embodiment, this data can be utilized in the comparison. Further, in an exemplary embodiment, a position of the user is known or otherwise ascertained, and a known signal is played through the home speaker. In embodiments where the frequency response of the speaker is known, the expected frequency at the users ears can be calculated or otherwise estimated, and a difference between what is calculated and/or estimated vs. that which is captured can be evaluated/compared.

In some scenarios of use, such as when the recipient is naturally interacting with the smart home system, the smart home system could use the microphone array thereof to determine a position of the user and/or a distance from the signal source to compensate for distance and obtain a more accurate comparison. In this scenario, the system could also use the known output characteristics of the smart home speaker as a comparison source. In some embodiments, expected frequency characteristics are compared to the expected frequency characteristics of the microphone in order to determine whether microphone cover degradation of the hearing prosthesis has occurred and/or how much.

Referring back to any of FIGS. 3 to 7, an exemplary embodiment includes a system, comprising a hearing prosthesis including a microphone (e.g., the BTE device 10X, where element 1010 is the microphone thereof) and a high-performance microphone system (such as the subsystem of an Alexa device). In this embodiment, the microphone system is a separate component from the hearing prosthesis. Further, consistent with the teachings above, the system is configured to compare data based on sound captured by the hearing prosthesis to data based on sound captured by the microphone system to determine a state of sound capture performance of the hearing prosthesis. This could be that the state of the sound capture performance is good, average, or bad, for example, and/or could entail providing a percentage basis relative to, for example, the results of the sound capture performance of the hearing prostheses when the hearing prostheses was new, for example. The state of the sound capture performance could be a relative concept based on statistical data. For example, the microphone is operating at a 90% effectivity, which could mean that for a statistically significant population of recipients, they would understand 90% of what is heard when given a standardized hearing test for example, based on the output quality of the microphone, whereas for a perfectly functioning microphone, the score would be 100%. Further by example, 90% of speech sounds can be identified or otherwise heard at a 90% efficiency, or that people would need to speak on average 10% louder for one to understand such, with such microphone. Any device, system or method and any standard that can enable the evaluation of the effectivity of a microphone can be used in some embodiments.

In some embodiments, the state of the performance can be a pass-fail state, or a replace immediately (all or some specified components, for example, the cover, the microphone, etc.—the method could identify the specific component) or replace within a month or some other time period, or repair or clean, etc., and/or instructions (e.g., place unit in a dry-and store, clean microphone ports by doing XYZ, etc.) which time period can be based on statistical samples of when the sound capture performance would become of sufficiently unacceptable quality. The system could extrapolate this date based on prior analysis, for example (linear using 2 points, a quadratic or a curve fit using 3 or more points, etc.). The system could identify where replacement components and/or cleaning components can be obtained and/or what components should be obtained, etc.

Any quantifier qualifier that can provide utilitarian indicia of the state of the microphone can be utilized in at least some exemplary embodiments as the state of the sound capture performance of the hearing prostheses.

In an embodiment of this embodiment, the system can include a sub-system configured to be in signal communication with the hearing prosthesis and the microphone system (e.g., by wireless communication). Here, the sub-system is a separate component from the microphone system and a separate component from the hearing prosthesis and the sub-system is configured to execute the comparison and to make the determination.

In an exemplary embodiment, the microphone system includes an array of at least 1, 2, 3, 4, 5, 6, 7, 8, 9, 10, 11, 12, 13, 14, 15, 16, 17, 18, 19, 20, or 30, or 40, or 50 or more, or any value or range of values therebetween in one increment (3-5, 1-7, 33, etc.) microphones mounted on a common chassis (e.g., an Alexa device, for example, or a single tabletop conference room teleconference station (as distinguished from a plurality of stations on a long table, which would have a plurality of respective chasses). In an exemplary embodiment, the hearing prosthesis includes no more than 1, 2, 3, 4, 5, 6, 7, 8, 9, or 10 microphones or any value or range of values therebetween in one increment.

In an exemplary embodiment, the system is configured to compare respective frequency responses from the microphone(s) of the hearing prosthesis to the microphone(s) of the microphone system to determine the state of sound capture performance of the hearing prosthesis. In an exemplary embodiment, if the resulting frequency response is the same or otherwise within a predetermined statistically insignificant difference, a determination will be made that the microphone(s) of the hearing prosthesis are adequately functioning or otherwise not in need of maintenance (which could include cleaning or replacement or adjustment, and reference to microphone replacement, and disclosure of such maintenance the microphone herein corresponds to an alternate disclosure where maintenance is performed on a supporting component of the microphone, such as the microphone cover, etc.). In some embodiments, the frequency response will be different depending on whether there is something in between the sound source and one or more of the microphones, whether that of the prosthesis or of the microphone system (non-prosthesis) component. Accordingly, in at least some exemplary embodiments, there is utilitarian value with respect to determining the locations of the recipients and/or the prostheses and/or the non-protheses microphones and/or of the sound source.

Thus, in some exemplary embodiments, there are methods that include and/or systems that are configured to determine one or more or all of the aforementioned locations and evaluate whether or not there is a component located between the various microphones and/or the sound source and/or otherwise determine whether there is something that would skew or otherwise change the resulting frequency responses in a manner that skews the differences that would otherwise frustrate determination as to whether or not a microphone and the hearing prosthesis is functioning adequately.

In an exemplary embodiment, a building map or a house map or the like can be used in conjunction with the computer or some other input device where a recipient or caregiver or someone of capability inputs the locations of obstacles that could interfere with the frequency response or otherwise interfere with the teachings detailed herein. Alternatively, and/or in addition to this, there can be a system or device or a method where an entity input data or otherwise works with the system to develop data that is indicative of good and/or bad locations to implement the teachings detailed herein. In an exemplary embodiment, the user or some other entity can utilize a positioning system, which could be that which is available to be placed most smart phones or the like (e.g., such as the application they can indicate where property lines are located based on the location of the smart phone) and the entity could move around the house or other building and manually input data indicative of good and/or bad positions (e.g., based on some simple training, such as, for example, explaining to the entity that if there is something between the line of sight of the sound source and the various microphones, that is indicative of a location that would result that are not as good as the scenario where there is nothing in between the line of sight—indeed, in an exemplary embodiment, the entity could be instructed to utilize the camera function of the smart phone and input whether or not the entity can see the sound source for example where the microphone, etc.). In an exemplary embodiment, an entity could utilize the hearing prosthesis when it is brand-new or close to brand-new, and move around the given building and capture sound, where a system can automatically evaluate the captured sounds, where the idea being that because the prosthesis is new, the frequency response should be reasonably the same, and if there are locations where the frequency response is not the same, the system can record those locations and remember that those locations are not good locations to use the overall process. In an exemplary embodiment, the recipient or other entity can initiate the playing of some sound, such as music or a test signal, or a known voice, or simply general conversation, through a telephone (e.g., smart phone), such that the telephone speaker outputs a sound, and moving around such in the room. The microphone(s) can monitor the sound and notice non-linear changes indicating the presence of an obstacle.

A device, system, and/or method that can enable location determination and/or determination of optimum/sub optimal locations according to a given layout of a building can utilize at least some exemplary embodiments. Corollary to this is that in at least some exemplary embodiments, these systems and/or methods and/or devices are utilized to evaluate whether or not the microphones and the sound source(s) are located in optimum and/or sub optimal positions, and in some embodiments, discount the data accordingly (or enable or prevent the methods from being executed in the first instance).

It is also noted that in some scenarios, the recipient's own head can create an obstacle scenario. That is, a head shadow effect can be present, and this can be significant in a scenario where only a unilateral hearing device is worn. Accordingly, exemplary embodiments include taking into account the head shadow effect, such as when a unilateral hearing device is worn. In an exemplary embodiment, the system and/or methods can entail determining if a head shadow effect is present, and discounting and/or not discounting and/or preventing or enabling the methods herein depending on the determination.

In some embodiments where two hearing devices are utilized (one on each ear), there can be utilitarian value to determine, based on a comparison of the two devices, which one is on the side of the sound source and which one is on the other side. Accordingly, embodiments can entail determining such and discounting/enabling/preventing the method actions accordingly for the microphone in the shadow effect. In this regard, in some embodiments, the special frequency characteristics of the head shadow are checked, and if it is present, either corrected for or the measurement repeated a number of times until it is no longer there. In another embodiment the directionality of the microphones can be utilized to check the location of the sound source. In some embodiments, the sound source should be to the front/back on the hearing instrument side. The system can instruct the recipient to position himself or herself, or enable or prevent or discount data depending on the location.

Accordingly, in an exemplary embodiment, there is a system, such as any of the systems detailed herein and/or variations thereof, that is configured to receive input based on a position of a recipient of the hearing prosthesis and/or of a sound source and/or of the high performance microphone system, and that is configured to, based on the received input based on the position of the recipient (the system could determine the position, or infer a conclusion based on the data), determine whether the data based on sound captured by the hearing prosthesis and the data based on sound captured by the microphone system is adequate to determine a state of the sound capture performance. In this exemplary embodiment, upon the determination that the data is adequate, could proceed with the comparisons and/or the evaluations herein, and/or in other embodiments, upon a determination that that the data is not adequate, could prevent the comparisons and/or the evaluations herein. Alternatively, and/or in addition to this, in an exemplary embodiment, upon a determination that the data is adequate, the system could be configured to determine that the comparisons and/or evaluation should be acted upon, and/or in other embodiments, upon a determination that the data is not adequate, the system could be configured to determine that the comparisons and/or the evaluation should not be acted upon (disregard and/or discount the results, for example).

An exemplary embodiment can include a system, such as any of the systems detailed herein and/or variations thereof, that is configured to determine a position of a recipient of the hearing prosthesis, and compensate for differences in the respective data due to the fact that the microphone system is further from the recipient than the hearing prosthesis.

In an exemplary embodiment, there is a system that is configured to compare respective data based on sound captured by the hearing prosthesis at at least 2, 3, 4, 5, 6, 7, 8, 9, 10, 11, 12, 13, 14, 15, 16, 17, 18, 19, 20, 25, 30, 35, 40, 45, 50, 60, 70, 80, 90, 100, 150, 200, 250, 300, 400, or 500 or more or any value or range of values therebetween in 1 increment separate respective temporal periods to respective data based on sound captured by the microphone system at the respective temporal periods, and discount a comparison that indicates a state of the sound capture performance of the hearing prosthesis when compared to other comparisons. By way of example only and not by way of limitation, there may exist scenarios where the system receives a false positive. Indeed, in an exemplary embodiment, the system is configured to evaluate input, such as the data based on sound captured by the hearing prosthesis, the data based on sound captured by the microphone system, the location data (or data based on location/indicative of location, etc.) etc., and determine a likelihood of a false positive, and discount an evaluation or comparison and/or prevent an operation of the system (e.g., not declare that the microphone is performing suboptimally, etc.).

In an exemplary embodiment, the aforementioned temporal periods can fall within a period of time that extends from 1, 2, 3, 4, 5, 6, 7, 8, 9, 10, 11, 12, 13, 14, 15, 16, 17, 18, 19, 20, 25, 30, 35, 40, 45, 50, 60, 70, 80, 90, 100, 150, 200, 250, 300, 400, or 500 minutes, or hours, or days, or weeks, or any value or range of values therebetween in 0.1 minute increments, etc.

In an exemplary embodiment, by executing testing over multiple periods, it is more likely that false positives can be eliminated or otherwise identified. In this regard, if, for example, two or three tests are taken, and only one of the tests indicate or otherwise are indicative of a problem with the microphone, in at least some exemplary scenarios, it can be deduced that there is no problem with microphone, and it was other factors that was causing the differences between the reference microphone and the microphone of the hearing prosthesis. Indeed, in at least some exemplary embodiments, the comparisons could be repeated a number of times over the course of an hour or a day or multiple days, the more times the comparison being executed, the more likely that false positives are detected or otherwise eliminated from the pool of samples/comparisons. In an exemplary embodiment, there can be continued monitoring and triggering of an alarm/alert/indication when the system indicates a problem (e.g., failure mode) for more than a specified period of time, such as more than 0.5, 0.75, 1, 1.25, 1.5, 1.75, 2, 2.5, 3, 4, 5, 6, 7, 8, 9 or 10 or any value or range of values therebetween in 0.1 increments, hours or days, etc.

Figure 14:
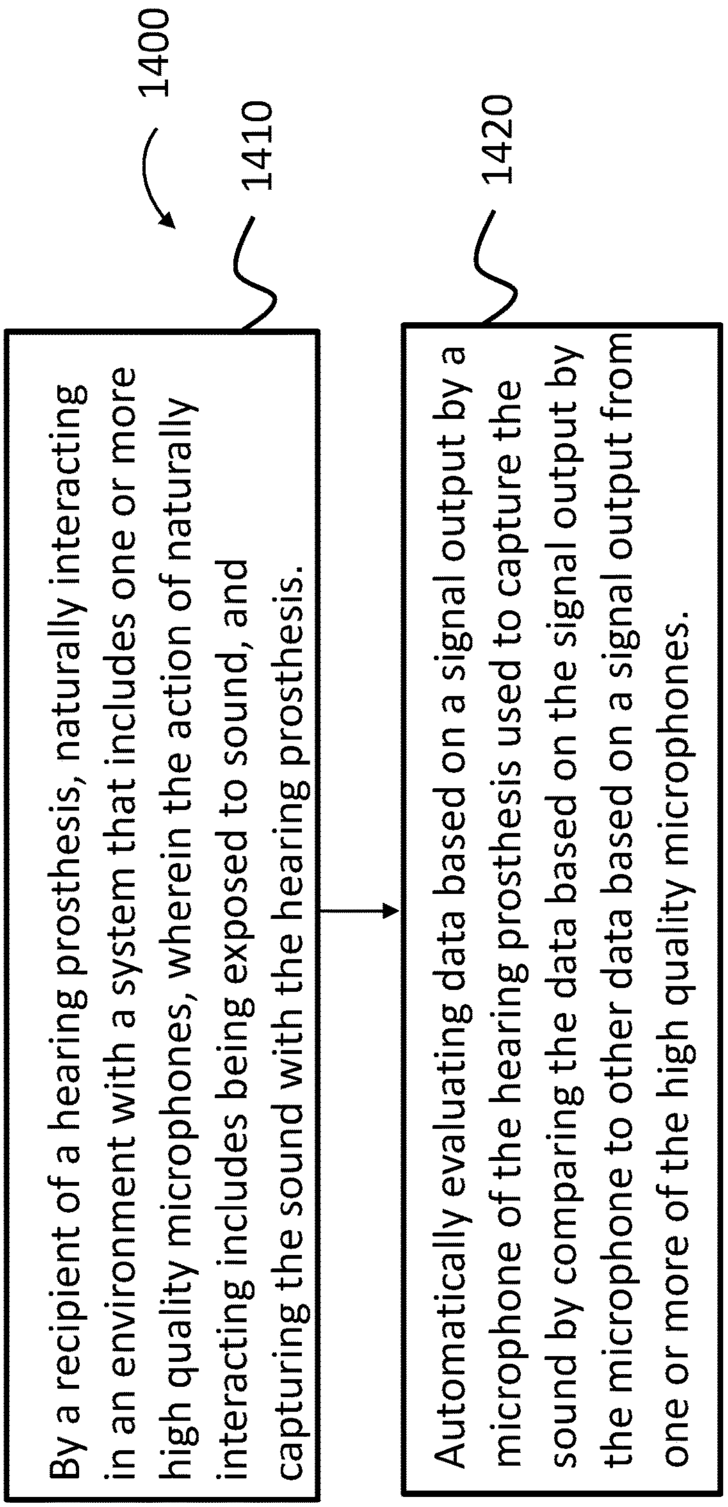

FIG. 14 presents an exemplary algorithm for an exemplary method, method 1400, which includes method action 1410, which is, by a recipient of a hearing prosthesis, naturally interacting in an environment with a system that includes one or more high quality microphones, wherein the action of naturally interacting includes being exposed to sound, and capturing the sound with the hearing prosthesis. In an exemplary embodiment, the environment can be an environment such as a home, where, for example, a radio is playing or a television is on or people are speaking to each other, or there is some background noise (central air fan, a dishwasher, etc.) etc. In an exemplary embodiment, the environment can be an office environment, where, for example, radio was playing or a conference is occurring, etc.

Method 1400 further includes method action 1420, which includes automatically evaluating data based on data based on a signal output by a microphone of the hearing prosthesis used to capture the sound by comparing the data based on the signal output by the microphone to other data based on data based on a signal output from one or more of the high quality microphones.

The above exemplary scenarios raise an issue of a scenario where some background sounds may be more utilitarian with respect to implementing the teachings detailed herein than others. In some scenarios, there can be a presence of multiple sound sources in the same space, where one or both could be used or discounted based on frequency content, level, presence of obstacles (including the head shadow), etc. In this regard, there are devices, systems, and/or methods that can evaluate the captured sound determine whether or not the captured sound is suitable for the various comparisons and evaluations detailed herein. Further, the devices can exclude some content from the evaluation (such as from a source that is affected by an obstacle). By way of example only and not by way of limitation, certain frequencies may be more desirable to evaluate than others. In this regard, speech frequencies would potentially have primacy over, for example, frequencies at 10,000 Hz or the like. In an exemplary embodiment, frequencies associated with fire alarms or the like could have primacy over frequencies associated with, for example, a leaf blower, or some other sound that people generally do not like to hear/the improvements of hearing such might actually not be desirable. Also, in some embodiments, a stratified frequency spectrum may be more utilitarian than a jumbled frequency spectrum, or vice versa. The point is, some embodiments include purposely discounting or otherwise ignoring input based on the analysis of the underlying sound content. Still further, some embodiments include evaluating the captured sound of determining whether or not the comparison should be executed in the first instance. Indeed, in an exemplary embodiment, the evaluations of the captured sound can be utilized as a trigger or the like to determine whether or not the method should be executed, especially those that are automatically executed based on some form of temporal schedule or some other schedule. Corollary to this is that in at least some exemplary embodiments, the captured sound can be evaluated to determine whether or not a manual initiated comparison should be executed. For example, in embodiments where the devices and systems and methods detailed herein are initiated because a recipient or a caregiver or some other entity initiates the methods for whatever reason (e.g., the recipient feels that the sound quality is not quite as good as it was or should be), based on the quality of the captured sound or otherwise the content of the captured sound, the method might not be executed.

Referring back to FIG. 14, in an exemplary variation of method 1400 (an extension of method 1400), there is further the action of accessing a computer-based application that interacts and/or interfaces with the system, which application executes the action of automatically evaluating. This can be an app on a smart phone. This can be an Internet-based application or a computer-based application. In an exemplary embodiment, the sound captured by the various microphones, or more accurately, data based on data based on the sound captured by the various microphones (and disclosure herein of a signal corresponds to an alternate disclosure of data based on the signal and data based on data based on the signal, and any disclosure herein of data based on a signal corresponds to a disclosure of data based on data based on a signal) is continuously or semi-continuously recorded (it can be recorded over every few minutes or every hour, etc., akin to how the black boxes of an aircraft operate), and upon the accessing of the application, this data is retrieved or otherwise utilized to implement the comparisons or otherwise the teachings detailed herein. That is, in an exemplary embodiment, the system is configured to execute the comparison upon command by the recipient or some other entity and/or upon an automatic initiation. Alternatively, and/or in addition to this, the application can then control the system to start collecting the data, and then upon a determination that sufficient data is collected, the teachings detailed herein regarding comparison and/or evaluation can then be implemented.

In an exemplary embodiment, the action of evaluating a method action 1420 can include utilizing a reference characterization of the hearing prosthesis obtained at a statistically high likelihood of optimal microphone of the hearing prosthesis performance to discount results that would indicate poor performance of the microphone of the hearing prosthesis. By way of example only and not by way of limitation, the reference characterization can be that obtained when the hearing prosthesis is newer relatively new, and/or that which is obtained with respect to a new microphone prior to or after its incorporation in the hearing prostheses (it could be information from the manufacturer of the microphone, which may not necessarily be the same manufacturer as the hearing prostheses). Alternatively, and/or in addition to this, the reference characterization can be features of the microphone that were obtained in close temporal proximity, such as essentially immediately after, maintenance on the prostheses which maintenance could have included an evaluation of the microphone and a determination of the microphone is acceptable. Thus, in an exemplary embodiment, the reference characterization can be utilized as a control or the like where, for example, if the results are so different from the reference characterization that, as a matter of statistics, there is a possibility that the comparison is skewed from something other than a defect associated with the microphone of the prostheses, the results of any comparison can be discounted. That said, in some embodiments, a determination can be made before a comparison that the data from the prostheses microphone should not be utilized.

Corollary to the above, in an exemplary embodiment, the action of evaluating a method action 420 includes utilizing a model of expected differences between frequency responses of the microphone of the hearing prosthesis and the one or more high quality microphones to discount results that would indicate poor performance of the microphone of the hearing prosthesis.

In view of the above, it can be seen that in at least some exemplary embodiments rely on one or otherwise utilized an analysis of the frequency content. For example, a frequency content can be utilitarian with respect to the fact that it does not change with distance. That is, distance is irrelevant in at least many of the implementations of the teachings detailed herein. Conversely, obstacles could result in a change in frequency content. Thus, there is utilitarian value as detailed herein to determining whether or not there is an obstacle. Corollary to all of this is that there can thus be utilitarian value with respect to performing multiple tasks/comparisons over different periods of times. For example, if one of the tests were executed with an obstacle between the sound source in one of a given microphones, by taking multiple tasks, where the person might move over the entire temporal period of the tests, that can reduce the likelihood that the obstacle continues to skew the data. That said, in an exemplary embodiment, there can be methods and systems and devices where the system is configured to only take a second test or two implement additional tests upon a determination that the recipient has moved, such as, for example, moving from one room to another. The idea being that the likelihood that two separate rooms with two separate sound sources for example would have the same obstacles would be low. Thus, at least one of the two tests will have data that is not skewed by an obstacle.

Also, it is noted that at least some exemplary systems, such as those with analysis capabilities as detailed herein or variations thereof, could in fact evaluate the signal and determine whether or not there is an obstacle, and thus discount or otherwise determine that the comparison should not be used or otherwise that the comparison should not take place in the first instance.

Figure 15:
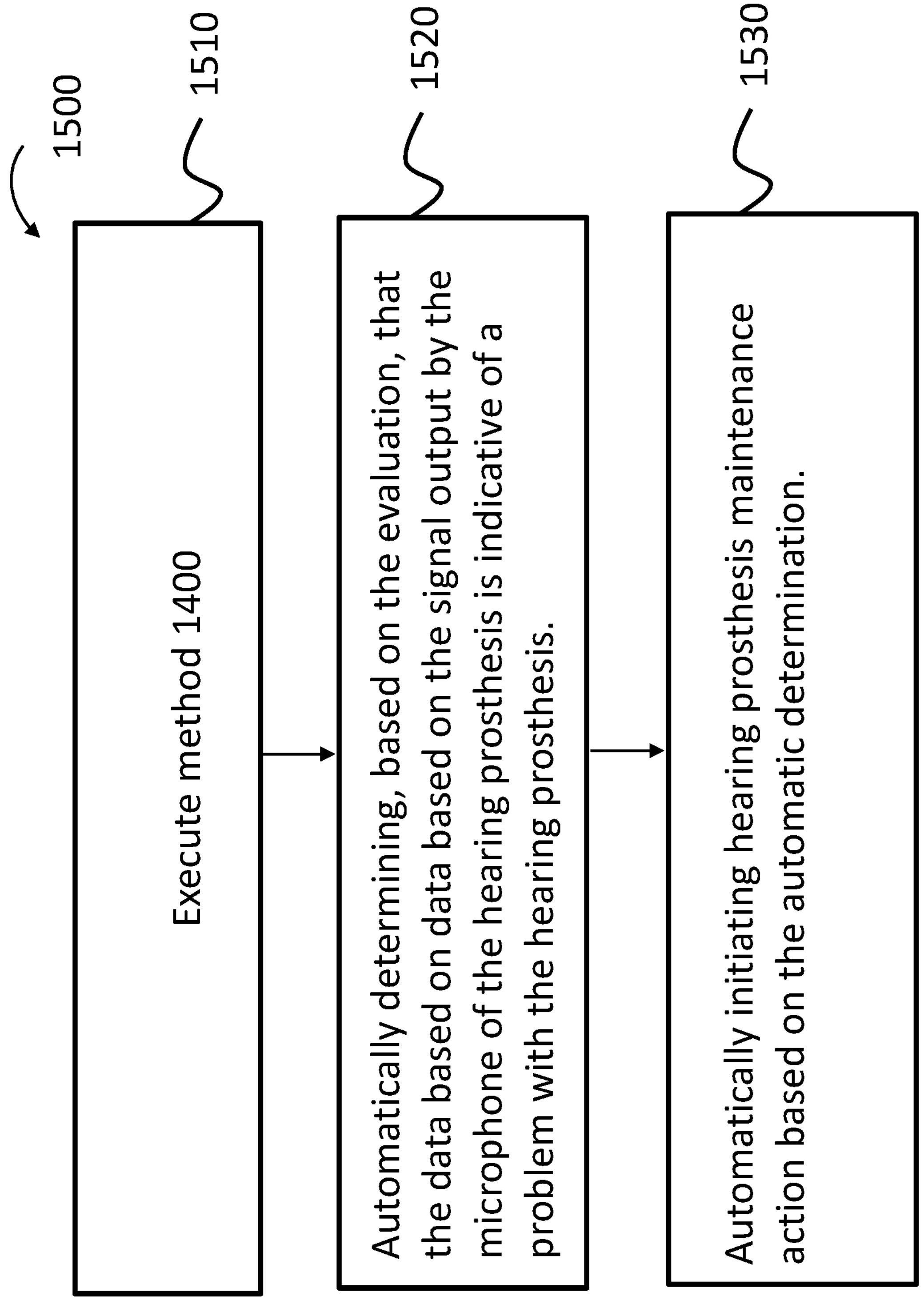

FIG. 15 presents an exemplary flowchart for an exemplary method, method 1500, according to an exemplary embodiment. Method 1500 includes method action 1510, which includes executing method 1400. Method 1500 further includes method action 1520, which includes automatically determining, based on the evaluation, that the data based on data based on the signal output by the microphone of the hearing prosthesis is indicative of a problem with the hearing prosthesis. Further, method 1500 also includes method action 1520, which includes automatically initiating hearing prosthesis maintenance action based on the automatic determination. By way of example only and not by way of limitation, there can be a system that can be configured to evaluate the comparison and/or receive the results of the comparison and/or receive a conclusion based on the results of the comparison, etc. or execute the comparison itself, and then automatically initiate delivery of, for example, a new microphone cover, or a cleaning package, etc., to the recipient or a caregiver of the recipient or some other entity associated there with. In some embodiments, a new microphone could be delivered to the recipient automatically. Further, a maintenance action could be replacements of the entire prostheses in some scenarios.

In an exemplary embodiment, there is an additional action associated with method 1400, which includes the action of executing a probabilistic placement algorithm and using the results thereof in the action of automatically evaluating the data based on data based on a signal output by a microphone of the hearing prosthesis. In this regard, as noted above, embodiments can include determining a location of a recipient or a sound source or of a microphone, etc., and utilize such in the evaluations of the like. In an exemplary embodiment, certain things can be deduced from the sound received by the various microphones. By way of example only and not by way of limitation, directionality features of some of the high-performance microphone systems can be utilized to determine a location of a sound source and/or of a recipient (who may speak from time to time or the like or otherwise make sounds that can be picked up by the high-performance microphones). Still further by way of example, the hearing microphones could include data that can be utilized to determine at least directionality of a sound source.

Still further by way of example only and not by way of limitation, certain things can be deduced from ambient sound. By way of example only and not by way of limitation, sounds of plates or the like clanking together combined with the sound of running water could indicate that the recipient is close to or otherwise in a kitchen near a sink. In an exemplary embodiment, if the system determines that the recipient is near a sink, for example, and the system recognizes or otherwise "understands" that there is no sound source and/or no microphone system that is suitable to implement the teachings detailed herein, data can be discounted or otherwise some actions detailed herein can be prevented from being executed.

Conclusions can be deduced from the content of captured sound. By way of example only and not by way of limitation, if the phrase "change the channel" is captured, and a speech recognition or some other software package can determine that such language was uttered, a deduction could be made that the recipient is in the room with a television, which room would be large enough for other people to be in the room there with. In an exemplary embodiment, the content from the microphones can be evaluated to determine whether or not there exists a reverberant sound, for example, which can be indicative of being in a kitchen as opposed to being in the den. Still further, a conversation indicating a change of channel would be less likely to be executed in, for example, a bedroom with a TV, perhaps. All of these are simple exemplary scenarios that can be utilized in probabilistic placement algorithms.

Accordingly, embodiments can be such that one can assume certain things for a given output signal, and if that output signal is seen, those assumptions can be presumed to be present. By way of example only and not by way of limitation, in some embodiments, if an output is indicative of a television being on, some embodiments can assume that the recipient is located on a couch or the like, and thus in for the position of the recipient.

As can be seen, some embodiments can be implemented where it is not necessary for the recipient to speak to determine or otherwise deduced or inferred or the location of the recipient. That said, embodiments, such as those detailed above that have voice recognition or the like, can utilize speech of the recipient to determine the location of the recipient.

Of course, in at least some exemplary embodiments, sensors like can be utilized to determine placement of the various elements of the system. Infrared systems can be utilized to track or otherwise identify the location of components, in some embodiments, in three dimensions. Also, these systems can be utilized to determine or otherwise estimate a direction that the recipient is facing, etc., which can impact the data, and use such in the determinations or discount data, etc.

Moreover, the teachings detailed herein can be implemented utilizing so-called smart systems. These systems can, over time, learn. For example, in an exemplary embodiment, the system could potentially interact with the recipients by, for example, querying the recipient as to whether or not the recipient is located at X or Y or whether or not a microphone is located at C. The recipient can provide feedback, such as, for example, a simple yes or no, and then the system could learn from the feedback utilizing traditional machine learning algorithms or the like.

All the above said, in an exemplary embodiment, the recipient can affirmatively provide input to the system indicating where certain things are located. In an exemplary embodiment, the recipient could declare, such as by speaking, that sound source is the television located 10 feet in front of me, and the microphone system is located 8 feet from the television and 5 feet from me to the right of me or something along those lines. If the system utilizes a speech recognition system, it could analyze the speech and utilize the data to position the various components of the system.

In yet another exemplary embodiment, there is an additional action associated with method 1400, which includes the actions of determining a likelihood that an obstacle is present between a sound source and the microphone of the hearing prosthesis and/or the one or more high quality microphones and using the results of the determination of the likelihood of the obstacle in the action of automatically evaluating the data based on data based on a signal output by a microphone of the hearing prosthesis. As noted above, in at least some exemplary embodiments, obstacles can have a deleterious effect on the sound captured by the various microphones, at least with respect to implementing the teachings detailed herein. In an exemplary embodiment, upon a determination that there is an obstacle or otherwise the likelihood that there exists an obstacle as just detailed, results and/or data can be discounted or otherwise actions herein can be not taken/prevented.

In view of the above, it can be seen that in at least some exemplary embodiments can be implemented utilizing high-performance microphone systems. In at least some exemplary embodiments, such high-performance microphone systems can include systems that include 2, 3, 4, 5, 6, 7, 8, 9, 10, 11, or 12 or more microphones or any value or range of values therebetween in one increment that can simultaneously capture a given sound (e.g., a sound that is in a room, as distinguished from microphones that cannot capture a given sound simultaneously, as will be the case with microphones arrayed throughout the building in different rooms for example). In an exemplary embodiment, such high-performance microphone systems can have utilitarian value with respect to being able to capture sound in a quality manner consistently at a significantly statistically higher rate relative to other systems, all other things being equal. In an exemplary embodiment, this can be because in the event that one microphone of the system becomes impaired or otherwise is not capturing sound in a quality manner, the other microphones are unlikely to also be impaired, and thus the system will output a high-quality signal. In at least some exemplary embodiments, this embraces the concept of redundancy. Of course, there is a possibility that the microphones could fail at the same time or otherwise become degraded at the same time at the same amount, but such a scenario is typically highly unlikely, and certainly not a problem with respect to a device that is not a life critical device.

The above said, in at least some exemplary embodiments, quality microphones can be used, including in some instances one microphone. High quality microphones could be microphones that have a relatively statistically high likelihood of obtaining and outputting a quality output relative to other microphones, all things being equal. It is noted that the high-performance microphone systems may not necessarily utilize high quality microphones.

The above said, in at least some exemplary embodiments, regular microphones (non-high quality microphones) are utilized.

In view of the above, it can be seen that at least some exemplary embodiments utilize commercially available microphones/microphones that are already located in a given building, such as a house, to acquire reference data that is utilized for comparison purposes to data based on output from a microphone of the hearing prostheses, and to evaluate the performance of that microphone of the hearing prostheses.

Some exemplary embodiments explicitly do not utilize landline phones (and thus the microphones thereof) were microphones of smart phones or cell phones or telephones in general or microphones and headsets, or the like in view of the fact that such microphones can often be subject to the same problems that can occur to the microphone of the hearing prostheses (cover clogging, etc.). Conversely, the utilization of conference systems that include, for example, through more microphones, can be utilized to implement at least some of the teachings detailed herein. Moreover, microphone systems that are utilized to pick up sound at a distance can be utilized in at least some of the exemplary embodiments, owing to the features associated there with tend to result in a statistically higher likelihood of a quality output signal relative to that which would be the case with respect to some other types of microphones.

An embodiment can utilize the so-called microphone testing skill of the Alexa system. In an exemplary embodiment, the methods detailed herein can utilize this microphone testing to validate the utility of the microphones that are utilized as the reference, and then implement the teachings detailed herein. That said, in an exemplary embodiment can include utilizing the microphone testing skill after the comparison, such as, for example, upon a determination that there is a significant difference between the microphone of the prostheses and the reference microphones. In this regard, this can be utilized to discount the likelihood of a false positive (where, for example, it is the reference microphone that is problematic). It is noted that these concepts are not limited to the Alexa system. Any device system or method that can enable the evaluation or otherwise testing of the reference microphones that can provide a confidence level that the output thereof has utilitarian value with respect to implementing the teachings detailed herein can be lies in at least some exemplary embodiments.

Embodiments of the above-noted comparisons and evaluations can utilize diagnostic techniques based on, for example, differences in a ratio of a selected characteristic indicative of the energy contained in selected high and/or low frequency bands and/or mid-frequency bands or any given frequency band of the respective output by the respective microphones. In an exemplary embodiment, one or more energy characteristics may be utilized. In an exemplary embodiment, a given energy characteristic can be the voltage of an audio signal, while in other embodiments, in addition to this or separate from this, the energy characteristic and the current to the audio signal. A maximum energy, average energy, etc., can be utilized in the comparisons. In some embodiments, a measured energy characteristic value may be the mean, median, root mean square (RMS), maximum or other measured or calculated value of the selected energy characteristic. Any aspect of a signal from any of the microphones that can enable the teachings detailed herein to be implemented can be utilized in at least some exemplary embodiments. In an exemplary embodiment, the comparisons and/or evaluations can be executed utilizing the teachings of U.S. Pat. No. 8,223,982, to Ibrahim Ibrahim, entitled Audio Path Diagnostics, except that instead of comparing output from the same microphone, the comparisons are from the different microphones detailed herein.

Consistent with the teachings detailed herein, where any one or more of the method actions detailed herein can be executed in an automated fashion unless otherwise specified, in an exemplary embodiment, the action of determining an intervention regime can be executed automatically.

It is noted that any method detailed herein also corresponds to a disclosure of a device and/or system configured to execute one or more or all of the method actions associated there with detailed herein. In an exemplary embodiment, this device and/or system is configured to execute one or more or all of the method actions in an automated fashion. That said, in an alternate embodiment, the device and/or system is configured to execute one or more or all of the method actions after being prompted by a human being. It is further noted that any disclosure of a device and/or system detailed herein corresponds to a method of making and/or using that the device and/or system, including a method of using that device according to the functionality detailed herein.

Any action disclosed herein that is executed by the prosthesis 100 can be executed by the device 240 and/or another component of any system detailed herein in an alternative embodiment, unless otherwise noted or unless the art does not enable such. Thus, any functionality of the prosthesis 100 can be present in the device 240 and/or another component of any system in an alternative embodiment. Thus, any disclosure of a functionality of the prosthesis 100 corresponds to structure of the device 240 and/or the another component of any system detailed herein that is configured to execute that functionality or otherwise have a functionality or otherwise to execute that method action.

Any action disclosed herein that is executed by the device 240 can be executed by the prosthesis 100 and/or another component of any system disclosed herein in an alternative embodiment, unless otherwise noted or unless the art does not enable such. Thus, any functionality of the device 240 can be present in the prosthesis 100 and/or another component of any system disclosed herein in an alternative embodiment. Thus, any disclosure of a functionality of the device 240 corresponds to structure of the prosthesis 100 and/or another component of any system disclosed herein that is configured to execute that functionality or otherwise have a functionality or otherwise to execute that method action.

Any action disclosed herein that is executed by a component of any system disclosed herein can be executed by the device 240 and/or the prosthesis 100 in an alternative embodiment, unless otherwise noted or unless the art does not enable such. Thus, any functionality of a component of the systems detailed herein can be present in the device 240 and/or the prosthesis 100 as alternative embodiment. Thus, any disclosure of a functionality of a component herein corresponds to structure of the device 240 and/or the prosthesis 100 that is configured to execute that functionality or otherwise have a functionality or otherwise to execute that method action.

It is further noted that any disclosure of a device and/or system detailed herein also corresponds to a disclosure of otherwise providing that device and/or system.

It is also noted that any disclosure herein of any process of manufacturing or otherwise providing a device corresponds to a device and/or system that results therefrom. It is also noted that any disclosure herein of any device and/or system corresponds to a disclosure of a method of producing or otherwise providing or otherwise making such.

Any embodiment or any feature disclosed herein can be combined with any one or more or other embodiments and/or other features disclosed herein, unless explicitly indicated and/or unless the art does not enable such. Any embodiment or any feature disclosed herein can be explicitly excluded from use with any one or more other embodiments and/or other features disclosed herein, unless explicitly indicated that such is combined and/or unless the art does not enable such exclusion.

While various embodiments of the present invention have been described above, it should be understood that they have been presented by way of example only, and not limitation. It will be apparent to persons skilled in the relevant art that various changes in form and detail can be made therein without departing from the spirit and scope of the invention.

What is claimed is:

1. A non-transitory computer-readable media having recorded thereon, a computer program for executing at least a portion of a method, the computer program including:

code for obtaining first data based on data based on ambient sound captured with a first microphone;

code for obtaining second data based on data based on the ambient sound captured with a second microphone; and code for comparing the first data to the second data, wherein the first microphone is a part of a hearing prosthesis, and the second microphone is part of an indoor sound capture system or indoor sound capture sub-system.

2. The media of claim 1, further comprising:

code for evaluating the comparison of the first data to the second data to determine whether there is an impairment associated with the first microphone.

3. The media of claim 1, wherein:

the indoor sound capture system or indoor sound capture sub-system is part of a household consumer product with a high-performance microphone system.

4. The media of claim 1, wherein:

the code for the comparison is located in and executed by the hearing prosthesis.

5. The media of claim 1, wherein:

the code for comparing the first data to the second data is located in and executed by a system of which the hearing prosthesis is a part, which system is configured to automatically determine a utilitarian temporal period to execute the comparison.

6. The media of claim 1, wherein:

the comparison is a test of the first microphone based solely on the first data and the second data, which first data and second data are captured within a temporal period lasting less than 8 hours.

7. A system, comprising:

a hearing prosthesis including a microphone; and a high-performance microphone system, wherein the microphone system is a separate component from the hearing prosthesis, and the system is configured to compare data based on data based on sound captured by the hearing prosthesis to data based on data based on sound captured by the microphone system to determine a state of sound capture performance of the hearing prosthesis.

8. The system of claim 7, wherein:

the system includes a sub-system configured to be in signal communication with the hearing prosthesis and the microphone system;

the sub-system is a separate component from the microphone system and a separate component from the hearing prosthesis; and the sub-system is configured to execute the comparison and to make the determination.

9. The system of claim 7, wherein:

the microphone system includes an array of at least three microphones mounted on a common chassis; and the hearing prosthesis includes no more than two (2) microphones.

10. The system of claim 7, wherein:

the system is configured to compare respective frequency responses from the microphone of the hearing prosthesis to the microphone(s) of the microphone system to determine the state of sound capture performance of the hearing prosthesis.

11. The system of claim 7, wherein:

the system is configured to receive input based on a position of a recipient of the hearing prosthesis and/or of a sound source and/or of the high-performance microphone system; and the system is configured to, based on the received input based on the position of the recipient, determine whether the data based on data based on sound captured by the hearing prosthesis and the data based on data based on sound captured by the microphone system is adequate to determine a state of the sound capture performance.

12. The system of claim 7, wherein:

determining the state of sound capture performance includes determining that hearing prosthesis microphone degradation has occurred.

13. The system of claim 7, wherein:

the system is configured to compare respective data based on data based on sound captured by the hearing prosthesis at at least three separate respective temporal periods to respective data based on data based on sound captured by the microphone system at the respective temporal periods; and the system is configured to discount a comparison that indicates a state of the sound capture performance of the hearing prosthesis when compared to other comparisons.

14. A method, comprising:
by a recipient of a hearing prosthesis, naturally interacting in an environment with a system that includes one or more high quality microphones, wherein the action of naturally interacting includes being exposed to sound, and capturing the sound with the hearing prosthesis; and
automatically evaluating data based on data based on a signal output by a microphone of the hearing prosthesis used to capture the sound by comparing the data based on data based on the signal output by the microphone to other data based on data based on a signal output from one or more of the one or more high-quality microphones.

15. The method of claim 14, further comprising:
accessing a computer-based application that interacts and/or interfaces with the system, which application executes the action of automatically evaluating.

16. The method of claim 14, wherein:
the action of evaluating includes utilizing a reference characterization of the hearing prosthesis obtained at a statistically high likelihood of optimal microphone of the hearing prosthesis performance to discount results that would indicate poor performance of the microphone of the hearing prosthesis.

17. The method of claim 14, wherein:
the action of evaluating includes utilizing a model of expected differences between frequency responses of the microphone of the hearing prosthesis and the one or more high quality microphones to discount results that would indicate poor performance of the microphone of the hearing prosthesis.

18. The method of claim 14, further comprising:
automatically determining, based on the evaluation, that the data based on data based on the signal output by the microphone of the hearing prosthesis is indicative of a problem with the hearing prosthesis; and
automatically initiating hearing prosthesis maintenance action based on the automatic determination.

19. The method of claim 14, further comprising:
executing a probabilistic placement algorithm and using the results thereof in the action of automatically evaluating the data based on data based on a signal output by a microphone of the hearing prosthesis.

20. The method of claim 14, further comprising:
determining a likelihood that an obstacle is present between a sound source and the microphone of the hearing prosthesis and/or the one or more high quality microphones; and
using the results of the determination of the likelihood of the obstacle in the action of automatically evaluating the data based on data based on a signal output by a microphone of the hearing prosthesis.

21. The system of claim 11, wherein:
the system is configured to receive input based on a position of the sound source; and
the system is configured to, based on the received input based on the position of the sound source, determine whether the data based on data based on sound captured by the hearing prosthesis and the data based on data based on sound captured by the microphone system is adequate to determine a state of the sound capture performance.

22. The system of claim 11, wherein:
the system is configured to receive input based on a position of the high-performance microphone system; and
the system is configured to, based on the received input based on the position of the high-performance microphone system, determine whether the data based on data based on sound captured by the hearing prosthesis and the data based on data based on sound captured by the microphone system is adequate to determine a state of the sound capture performance.

23. The media of claim 1, wherein:
a processor that executes the comparison is located in and executed by the hearing prosthesis.

24. The system of claim 7, wherein:
the system is configured to compare low pass filtered output from the microphone of the hearing prosthesis to low pass filtered output of the microphone(s) of the microphone system to determine the state of sound capture performance of the hearing prosthesis.

25. The system of claim 7, wherein:
the system is configured to determine a position of a recipient of the hearing prosthesis, and compensate for differences in the respective data due to the fact that the microphone system is further from the recipient than the hearing prosthesis based on the determined position.

26. The system of claim 9, wherein:
the microphone system is not part of a handheld telephone device.

27. The system of claim 9, wherein:
the microphone system is part of an indoor sound capture system.

28. The system of claim 9, wherein:
the microphone system is part of a conference room teleconference system.

29. The media of claim 3, wherein:
the indoor sound capture system or indoor sound capture sub-system is an indoor sound capture sub-system that is not part of a smartphone.

30. The media of claim 3, further comprising:
code for obtaining third data based on data based on the ambient sound captured with a third microphone; and
code for comparing the first data to the third data, wherein
the respective indoor sound capture system and a system of which the indoor sound capture sub-system is a different kind of system from a system of which the third microphone is a part, and
the third microphone is part of a smart phone.

31. The method of claim 14, wherein:
the one or more of the one or more high-quality microphones that outputted the signal outputted from one or more of the one or more high-quality microphones has not moved in 24 hours of sound capture by the one or more of the one or more high-quality microphones that outputted the signal output from one or more of the one or more high-quality microphones.

32. The method of claim 14, wherein:
the hearing prosthesis is moving while the hearing prosthesis is capturing sound and the one or more of the one or more high-quality microphones that outputted the signal output from one or more of the one or more high-quality microphones remains static while the hearing prosthesis is moving.

* * * * *